(12) United States Patent
Zhang et al.

(10) Patent No.: US 8,300,570 B2
(45) Date of Patent: Oct. 30, 2012

(54) RANGING REGIONS FOR WIRELESS COMMUNICATION RELAY STATIONS

(75) Inventors: Hang Zhang, Nepean (CA); Jianglei Ma, Kanata (CA); Peiying Zhu, Kanata (CA); Wen Tong, Ottawa (CA)

(73) Assignee: Research in Motion Limited, Waterloo, Ontario (CA)

( * ) Notice: Subject to any disclaimer, the term of this patent is extended or adjusted under 35 U.S.C. 154(b) by 902 days.

(21) Appl. No.: 12/299,259

(22) PCT Filed: Jun. 1, 2007

(86) PCT No.: PCT/IB2007/001452
§ 371 (c)(1),
(2), (4) Date: Oct. 31, 2008

(87) PCT Pub. No.: WO2007/141617
PCT Pub. Date: Dec. 13, 2007

(65) Prior Publication Data
US 2009/0073916 A1 Mar. 19, 2009

Related U.S. Application Data

(60) Provisional application No. 60/810,573, filed on Jun. 2, 2006, provisional application No. 60/892,570, filed on Mar. 2, 2007.

(51) Int. Cl.
*H04B 7/14* (2006.01)

(52) U.S. Cl. .................................... 370/315; 370/331
(58) Field of Classification Search .................. None
See application file for complete search history.

(56) References Cited

U.S. PATENT DOCUMENTS

| | | | |
|---|---|---|---|
| 2005/0041573 A1* | 2/2005 | Eom et al. | 370/208 |
| 2006/0209734 A1* | 9/2006 | Son et al. | 370/312 |
| 2007/0076684 A1 | 4/2007 | Lee et al. | |
| 2007/0201392 A1* | 8/2007 | Ramachandran | 370/315 |
| 2007/0249347 A1* | 10/2007 | Saifullah et al. | 455/436 |

FOREIGN PATENT DOCUMENTS
WO 2007/053954 A1 5/2007

OTHER PUBLICATIONS

International Search Report for PCT/IB2007/001452 mailed Nov. 7, 2007.
Lu, Yanling et al., "Initial Ranging in 802.16j System," IEEE 802.16 Broadband Wireless Access Working Group, Jan. 8, 2007, document No. IEEE C802.16j-07/077, retrieved from the Internet at http://wirelessman.org/relay/ contrib/C80216j-07_077.pdf.

(Continued)

*Primary Examiner* — David Oveissi
(74) *Attorney, Agent, or Firm* — Fish & Richardson P.C.

(57) ABSTRACT

One embodiment of the present invention provides a unique ranging technique in wireless communication environments that employ relay stations associated with a base station. Each relay station, and optionally the base station itself, can be allocated a unique ranging region having unique ranging resources that may be used by a mobile station to initiate a ranging function with the corresponding relay station or base station.

30 Claims, 22 Drawing Sheets

OTHER PUBLICATIONS

Mollah, Mohsin et al., "Network Entry Procedure for MS in 802.16j," IEEE 802.16 Broadband Wireless Access Working Group, Nov. 7, 2006, document No. IEEE C802.16j-06/154, retrieved from the Internet at http://www.ieee802.org/16/relay/contrib/C80216j-06_154.pdf.

Nohara, Mitsuo, "Session #48 802.16 Relay TG Session Summary/Closing Remarks (Rev.3)," IEEE 802.16 Broadband Wireless Access Working Group, Mar. 15, 2007, document No. IEEE 802.16j-07/011r3, retrieved from the Internet at http://www.ieee802.org/16/relay/docs/80216j-07_011r3.pdf.

Shen, Gang et al., "Recommendation on 802.16 MMR with Backward Compatibility," IEEE 802.16 Mobile Multihop Relay (MMR) Study Group, Nov. 11, 2005, document No. IEEE C802.16mmr-05/023, retrieved from the Internet at http://www.ieee802.org/16/sg/mmr/contrib/C80216mmr-05_023.pdf.

* cited by examiner

RANGING REGIONS FOR WIRELESS COMMUNICATION RELAY STATIONS

This application is a 35 USC 371 national phase application of PCT/IB2007/001452 filed Jun. 1, 2007, which claims priority to U.S. provisional patent application Ser. No. 60/810,573 filed Jun. 2, 2006 and U.S. provisional patent application Ser. No. 60/892,570 filed Mar. 2, 2007, the disclosures of which are incorporated herein by reference in their entireties.

FIELD OF THE INVENTION

The present invention relates to wireless communications, and in particular to wireless communication systems that employ relay stations.

BACKGROUND OF THE INVENTION

Wireless communication systems divide areas of coverage into cells, each of which has traditionally been served by a base station. The base stations support wireless communications with mobile stations. The coverage area provided by a given base station is generally referred to as a cell. As the mobile stations move from one cell to another, the communication sessions are transferred from one base station to another. Unfortunately, the coverage area for a base station can be limited and may vary based on geography and structures located within the coverage area.

In an effort to increase or improve the coverage area provided by base stations, relay stations have been introduced. Relay stations are associated with a given base station and act as liaisons between the mobile stations within the coverage area of the relay stations and the base station. For downlink communications, data may be transmitted from the base station to a relay station and from the relay station to the mobile station. For uplink communications, data may be transmitted from the mobile station to a relay station and from the relay station to the base station. As such, the uplink or downlink path may have multiple hops. Further, multiple relay stations may be provided in the uplink or downlink path. Even when relay stations are employed, mobile stations and base stations may also communicate directly, if the mobile stations are within communication range of the base stations.

As the demand for high speed broadband networking over wireless communication networks increases, so too does the demand for different types of networks that can accommodate high speed wireless networking. For example, the deployment of IEEE 802.11-based wireless networks in homes and business to create Internet access "hot spots" has become prevalent in today's society. However, these IEEE 802.11-based wireless networks are relatively limited in bandwidth as well as communication distance. Thus, these IEEE 802.11-based wireless networks are not good candidates for cellular implementations to provide continuous coverage over extended areas.

In an effort to increase bandwidth and communication distance for longer range wireless networking, the family of IEEE 802.16 standards was developed for next generation wireless communications systems that are cellular based. The IEEE 802.16 standards are often referred to as WiMAX, and provide a specification for fixed broadband wireless metropolitan access networks (MANs) that use a point-to-multipoint architecture. Such communications can be implemented, for example, using orthogonal frequency division multiplexing (OFDM) communication. OFDM communication uses a spread spectrum technique to distribute the data over a large number of carriers that are spaced apart at precise frequencies.

The IEEE 802.16 standards support high bit rates in both uplink and downlink communications up to a distance of about 30 miles (~50 km) to handle such services as Voice over Internet Protocol (VoIP), IP connectivity and other voice, media, and data applications. Expected data throughput for a typical WiMAX network is 45 MBits/sec. per channel. IEEE 802.16 networks, such as IEEE 802.16j, networks, can be deployed as multi-hop networks, which employ relay stations to act as liaisons between base stations and mobile stations and further extend the effective coverage areas of the associated base stations.

For multi-hop networks, including those employing the IEEE 802.16 standards, there is a need for efficient and effective techniques to provide various ranging functions, channel quality reporting functions, and retransmission control functions when the mobile stations are being served by relay stations. These functions are often critical to enabling effective communications. For example, initial and periodic ranging functions help ensure that mobile stations transmit at the appropriate time and power on the right frequency. The channel quality reporting function helps a mobile station identify and select an appropriate base station or relay station with which to anchor while the retransmission control function ensures that lost data is retransmitted as necessary. Currently, these functions are controlled primarily by the base station that is associated with the relay stations, and the resources of the group are often used inefficiently and performance is degraded.

SUMMARY OF THE INVENTION

One embodiment of the present invention provides a unique ranging technique in wireless communication environments that employ relay stations, which are associated with a base station. Each relay station, and perhaps the base station itself, is allocated a unique ranging region. Each ranging region has unique ranging resources that may be used by a mobile station to initiate a ranging function with the corresponding relay station or base station. The mobile station may select a relay station for ranging and then select ranging resources from the ranging region allocated to the selected relay station.

A ranging code is then transmitted by the mobile station using the ranging resources for the ranging region allocated to the selected relay station. The selected relay station will monitor the ranging resources assigned to it and detect the ranging code that was transmitted from the mobile station. The relay station will take steps to obtain transmission adjustments for the mobile station in light of receiving the ranging code, and will send transmission adjustments to the mobile station. The relay station may send transmission adjustment recommendations with the ranging code or information identifying the ranging code to the base station, which will determine actual transmission adjustments based on the transmission adjustment recommendations. Alternatively, the relay station may determine the transmission adjustments without employing the base station.

The ranging functions may provide initial or periodic ranging functions. Mobile terminals generally use the transmission adjustments from these ranging functions to control the timing, frequency, or power for subsequent transmissions. An initial ranging function is provided prior to initiating primary communications via the relay station or directly with the base station. A periodic ranging function is provided during the primary communications via the relay station or directly with the base station.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
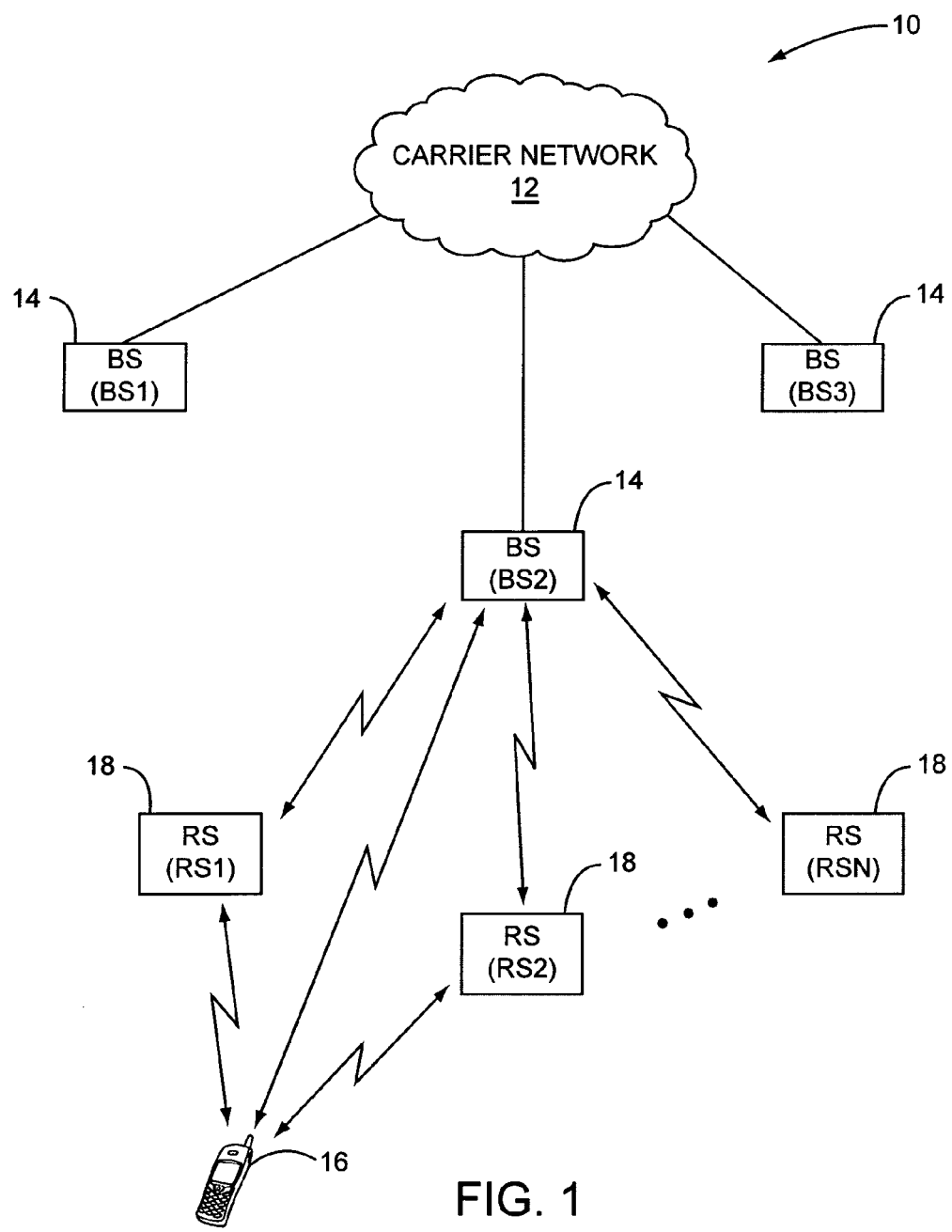
FIG. 1 is a wireless communication environment according to one embodiment of the present invention.

The present invention provides various techniques for improving wireless communications in wireless communication environments that employ relay stations. In general, relay stations are employed to extend the coverage area of a given base station by allowing the base station to communicate with a given mobile terminal via the relay station. With reference to FIG. 1, an exemplary communication environment 10 is illustrated, wherein a basic carrier network 12 supports multiple base stations (BS) 14. In general, the base stations 14 are capable of facilitating wireless communications with any mobile station 16 that is within an available communication range. Of the three base stations 14 illustrated in FIG. 1, BS1, BS2, and BS3, base station BS2 is associated with numerous relay stations 18, RS1-RSN. Given the location of the mobile station 16, the mobile station 16 may facilitate communications directly with the base station BS2 or indirectly with the base station BS2 through relay stations RS1 and RS2. Notably, the mobile station 16 may be located in an area that inhibits, and possibly even prohibits, direct communications with a base station 14, and as such, communications may be passed through a relay station 18 that is within communication range of the mobile station 16.

In most wireless communication environments, extensive efforts are made to minimize the interference that any given communication session has on other communication sessions within the same area. These efforts to minimize interference generally include controlling when different entities communicate, the channel to use when communicating, and the power to use to facilitate the communications. Accordingly, the mobile station 16, base station 14, and relay stations 18 cooperate to ensure that uplink (UL) communications from different mobile stations 16 arrive at the relay stations 18 or base stations 14 in a synchronized fashion and at relatively the same power levels. Synchronization of these communications generally requires that communications by the mobile station 16 be synchronized in time, and often in frequency, because the frequency used for communications defines all or part of the channel used to facilitate the communications.

To facilitate such synchronization, initial ranging techniques are employed to adjust the timing, frequency, and power that are used by the mobile station 16 to facilitate communications. Each mobile station 16 will participate in initial ranging prior to initiating communications. Once communications have commenced, periodic ranging may be employed to provide periodic adjustments to the timing, frequency, and power that are used by the mobile station 16 to facilitate ongoing communications. For initial or periodic ranging, the mobile station 16 will transmit an appropriate ranging code that is received by a relay station 18 or a base station 14, which will process the ranging code and communication parameters associated with actually receiving the ranging code to determine adjustments in timing, frequency, or power for the mobile station 16 to use for subsequent communications.

A ranging code is transmitted using defined communication resources, which for OFDM may be a defined group of sub-carriers along a time-frequency continuum that defines a transmission frame. The resources allocated for transmitting ranging codes are generally referred to as a ranging region. Each ranging region may include different sets of ranging resources that may be used at the same time by multiple mobile stations 16, or may be divided and distributed among multiple mobile stations 16, such that different mobile stations 16 have unique ranging resources within a given geographic area.

Figure 2:
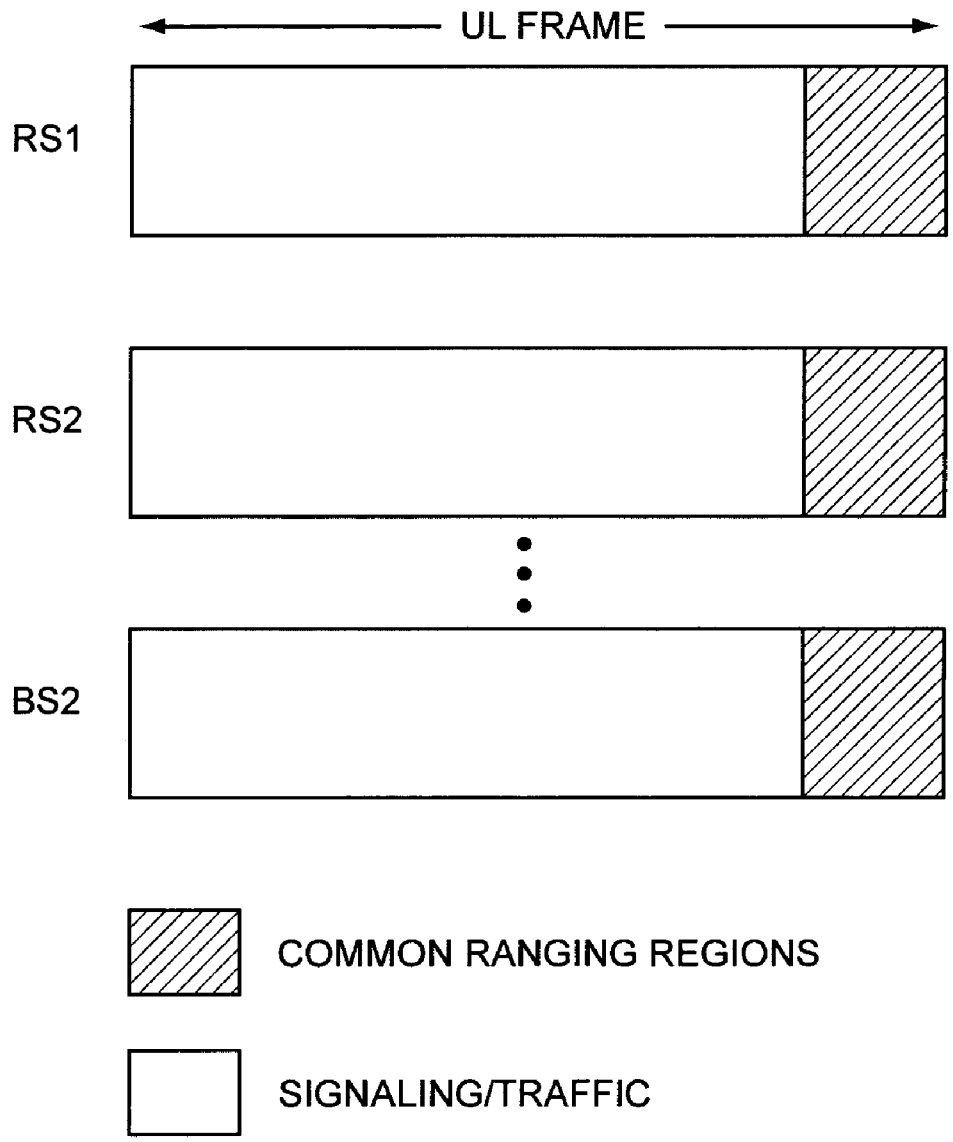
FIG. 2 illustrates common ranging regions in select frames according to one embodiment of the present invention.

In one embodiment, a common initial ranging region is provided for multiple mobile stations 16 to use. Accordingly, different mobile stations 16 may use the ranging resources within a common ranging region at the same time within a given geographic area. Preferably, different ranging code sets are assigned to different ones of the relay stations 18 and base stations 14. A ranging code within the code set is selected by each mobile station 16 and transmitted using the ranging resources within the common ranging region. Thus, the mobile station 16 can alert the relay stations 18 and the base stations 14 as to its intention of communicating with a particular one of the relay stations 18 or base stations 14 based on the code set from which the ranging code was selected. FIG. 2 illustrates a scenario where uplink frames intended for relay stations RS1 and RS2, along with base station BS2, have common ranging regions within which different mobile stations 16 may simultaneously transmit ranging codes.

Figure 3:
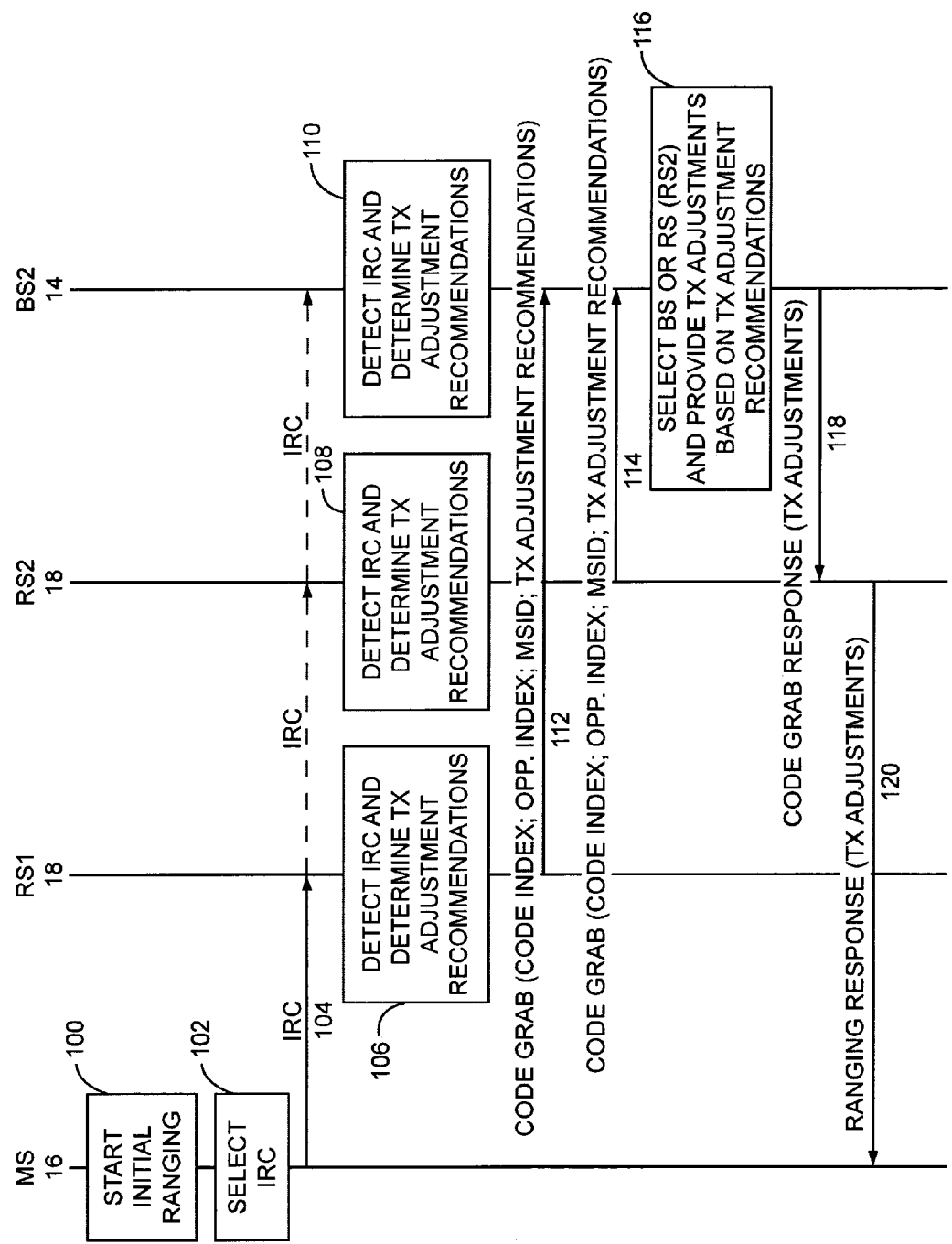
FIG. 3 is communication flow diagram illustrating a common ranging process according to one embodiment of the present invention.

With reference to the communication flow diagram of FIG. 3, an exemplary common initial ranging process is described. Initially, a mobile station 16 will start an initial ranging process (step 100) by selecting an initial ranging code (IRC) from a code set that is uniquely associated with one of the relay stations RS1, RS2, and the base station BS2 (step 102). In this case, assume the mobile station 16 is associated with relay station RS1, but is within communication range of relay station RS2 and base station BS2. Once the initial ranging code is selected, the mobile station 16 will transmit the initial ranging code (step 104). Notably, the initial ranging code transmitted by the mobile station 16 may be received by the relay station RS1, the relay station RS2, and the base station BS2, even through the mobile station 16 intends for the IRC to be received by relay station RS1.

Each of the relay station RS1, relay station RS2, and base station BS2 will detect the initial ranging code and determine transmission (TX) adjustment recommendations in light of reception characteristics associated with actually receiving and decoding the initial ranging code (steps 106, 108, and 110). The transmission adjustment recommendations may relate to any synchronization parameters, such as timing, frequency, and power associated with uplink communications from the mobile station 16 to one of the relay station RS1, relay station RS2, and base station BS2. The relay stations RS1 and RS2 will send code grab messages to the base station BS2, wherein the code grab messages may include a code index corresponding to the initial ranging code that was received, an opportunity index identifying the ranging resources within the common ranging regions that were used for transmitting the initial ranging code, the mobile station's ID (MSID) if available, and the transmission adjustment recommendations (steps 112 and 114).

Next, the base station BS2 will process the code grab messages and select one of the relay stations RS1 and RS2, or itself, to use for sending transmission adjustments back to the mobile station 16 (step 116). Selection of one of the relay stations RS1 and RS2 or the base station BS2 to use for providing the transmission adjustments is generally based on the transmission adjustment recommendations determined by the base station BS2 or received from the relay stations RS1 and RS2. The actual transmission adjustments to provide to the mobile station 16 are selected from the transmission adjustment recommendations for the selected one of the relay stations RS1 and RS2 and the base station BS2. At this point, the base station BS2 will send transmission adjustments to the mobile station 16, directly or via the selected relay station RS1 or RS2. In this example, assume the base station BS2 selected relay station RS2 to provide the transmission adjustments to the mobile station 16. As such, the base station BS2 will send a code grab response with transmission adjustments to the relay station RS2 (step 118), which will send a ranging response with the transmission adjustments to the mobile station 16 (step 120).

Figure 4:
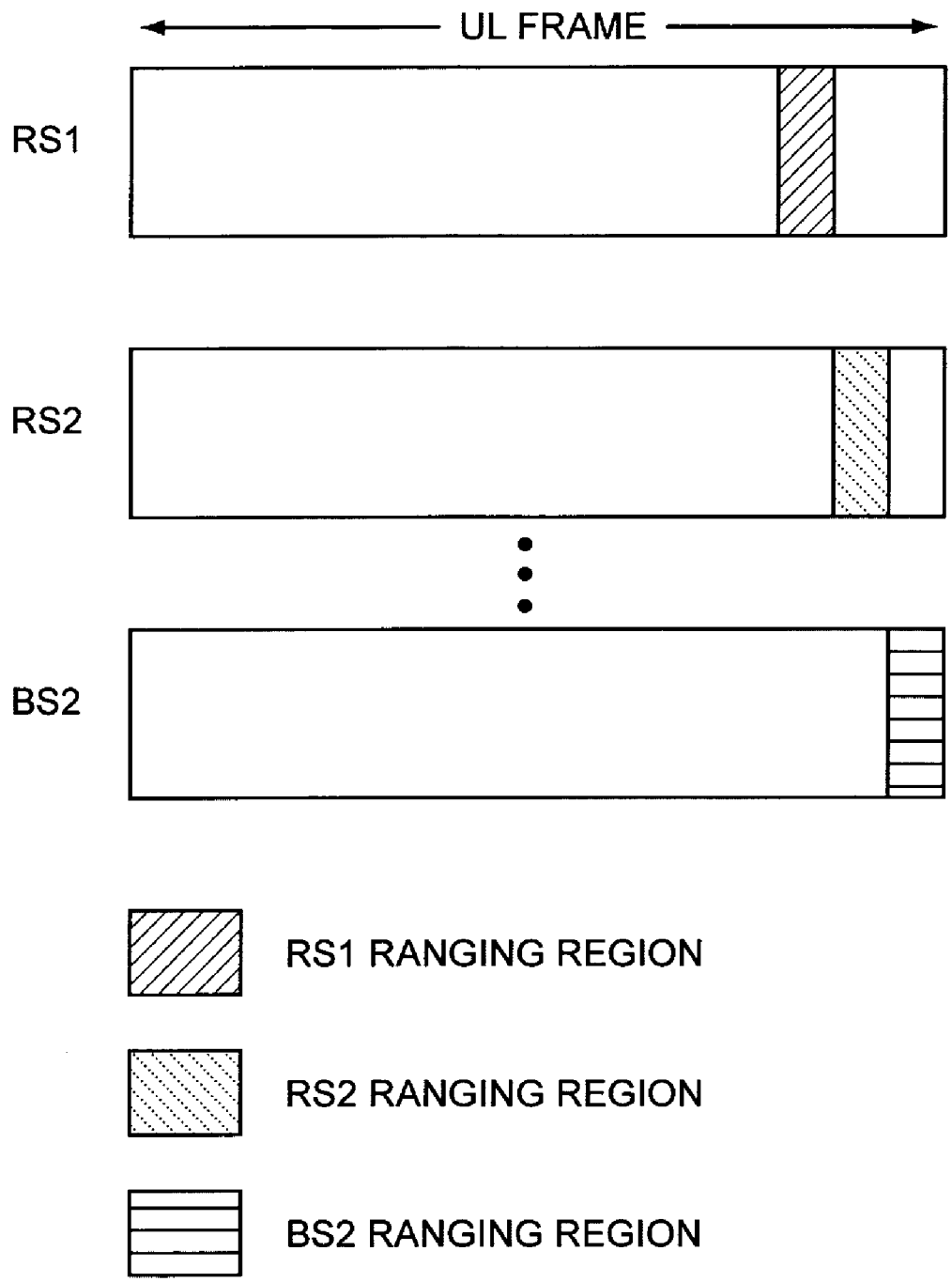
FIG. 4 illustrates distributed ranging regions in select frames according to one embodiment of the present invention.

In one embodiment of the present invention, different coordinated ranging regions are provided for associated relay stations 18 and base stations 14. As illustrated in FIG. 4, a different ranging region within an uplink frame is allocated to relay station RS1, relay station RS2, and base station BS2. As such, different ranging resources are used with different relay stations 18 or base stations 14. Thus, each base station 14 and relay station 18 associated with the base station 14 has a unique ranging region, which may be determined and allocated by the base station 14. Preferably, the ranging regions of neighboring relay stations 18 and associated base station 14 are orthogonal, in that the resources for the different ranging regions have different time-frequency locations within the uplink frame. If the relay stations 18 and associated base station 14 are far enough apart where interference is not an issue, certain relay stations 18 or base stations 14 may have common ranging regions. These ranging regions may be used for initial ranging, periodic ranging, bandwidth request ranging, and handover ranging. Bandwidth request ranging is simply ranging where requests for more or less bandwidth are being made, whereas handover ranging is ranging in preparation for a handoff from one relay station 18 to another, or from a relay station 18 to a base station 14. Accordingly, the ranging region in which a ranging code is transmitted will indicate the particular relay station 18 or base station 14 to which transmission of the ranging code was intended. In other words, the mobile station 16 can indicate its selection of a particular relay station 18 or base station 14 based on the ranging region selected for transmitting the ranging code.

Figure 5:
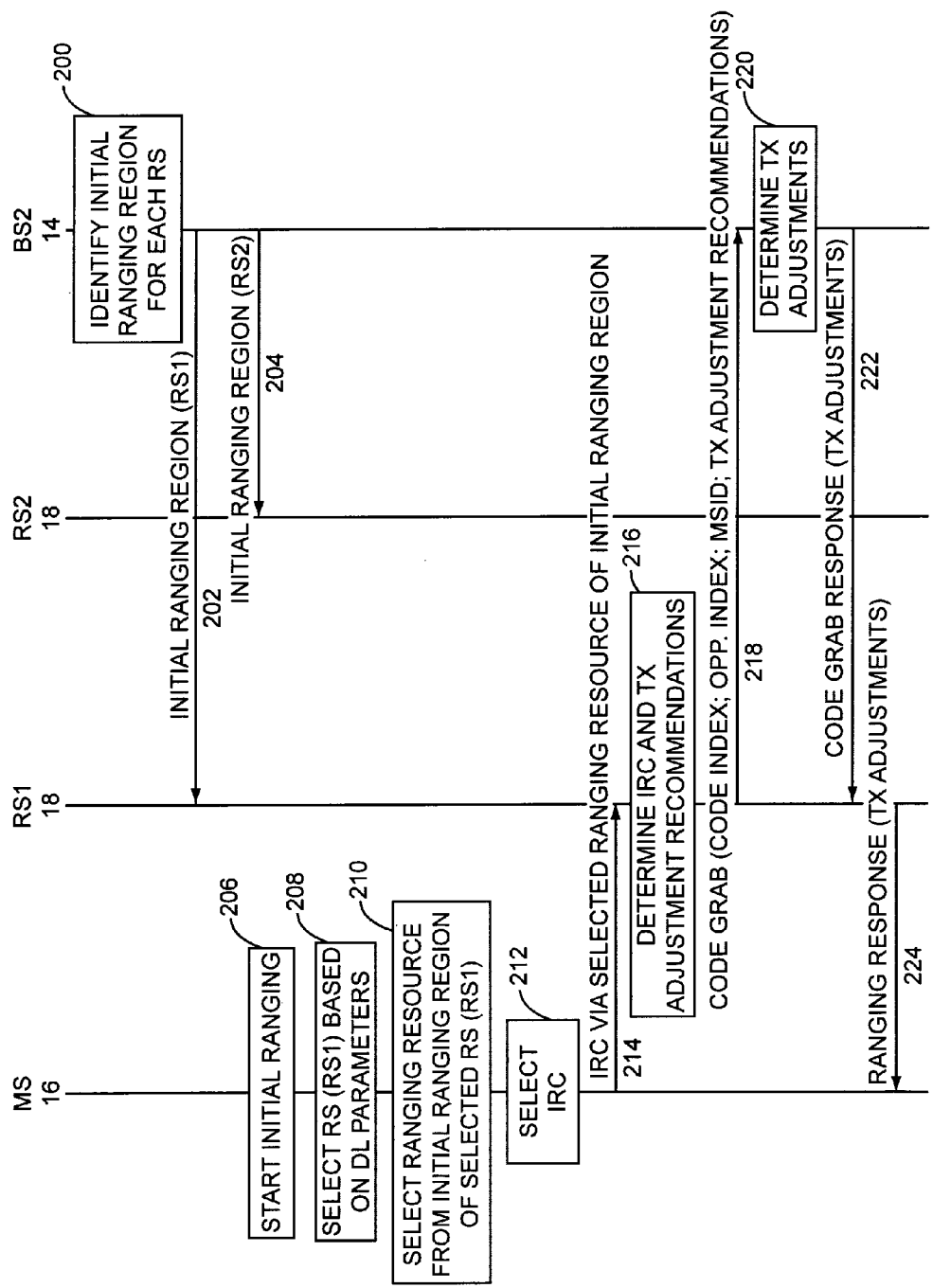
FIG. 5 is communication flow diagram illustrating a distributed ranging process according to one embodiment of the present invention.

Turning to the communication flow of FIG. 5, a coordinated initial ranging process is described according to one embodiment of the present invention. Initially, base station BS2, which is associated with relay stations RS1 and RS2, will identify initial ranging regions for each of the relay stations RS1 and RS2 (step 200). The different initial ranging regions are assigned to the respective relay stations RS1 and RS2 (steps 202 and 204), wherein each relay station RS1 and RS2 is aware of its unique initial ranging region. Notably, the base station BS2 may also determine a unique initial ranging region for itself.

Assuming the mobile station 16 is aware of the initial ranging regions assigned to the relay stations RS1 and RS2 and the base station BS2, the mobile station 16 will start initial ranging (step 206) by selecting a relay station 18 (or base station 14) based on various downlink parameters (step 208). The downlink parameters may be various transmissions, such as pilot symbol transmissions, from the relay stations RS1 and RS2 and the base station BS2. Assuming the mobile station 16 selects relay station RS1 for initial ranging, the mobile station 16 will select a ranging resource from the initial ranging region of the selected relay station RS1 (step 210). An initial ranging code is then selected (step 212) and transmitted by the mobile station 16 (step 214). Notably, the initial ranging code is sent via the ranging resource of the initial ranging region, which was allocated to relay station RS1. The initial ranging code transmitted by the mobile station 16 will not be processed by relay station RS2 or base station BS2, because the initial ranging code was not transmitted using ranging resources within the initial ranging regions associated with relay station RS2 or base station BS2. Accordingly, only relay station RS1 will detect the initial ranging code and determine transmission adjustment recommendations that bear on the time, frequency, or power used to transmit the initial ranging code (step 216).

The relay station RS1 may send to the base station BS2 a code grab message identifying a code index associated with the initial ranging code, an opportunity index identifying the resources used for transmitting the initial ranging code, the MSID of the mobile station 16 if available, and the transmission adjustment recommendations (step 218). The base station BS2 will determine transmission adjustments for the mobile station 16 based on the transmission adjustment recommendations (step 220). The base station BS2 will then send a code grab response including the transmission adjustments to the relay station RS1 (step 222), which will send the transmission adjustments in a ranging response message to the mobile station 16 (step 224). Although the above example is described in association with initial ranging, handoff, periodic, and bandwidth request ranging may take advantage of these techniques.

When mobile stations 16 can communicate with multiple relay stations 18 or base stations 14, fast switching and macro diversity handoff techniques may be employed. Fast switching techniques allow a given mobile station 16 to rapidly switch from one relay station 18 or base station 14 to another based on channel conditions, resource availability, and the like. In general, although the mobile station 16 can communicate with multiple ones of the relay stations 18 and base stations 14 at a given time, only one relay station 18 or base station 14 is communicated with at any given time. In contrast, macro diversity handoff, which is often referred to as a soft handoff, allows a mobile station 16 to simultaneously communicate with two or more relay stations 18 and base stations 14 at the same time. Macro diversity handoff may support uplink and downlink communications. Accordingly, two or more relay stations 18 and base stations 14 may receive a transmission from a mobile station 16, and may cooperate to either select or combine the received information. Similarly, a mobile station 16 may receive the same information from two or more of the relay stations 18 or base stations 14 and may use selection or combining techniques to recover the transmitted information. For fast switching or macro diversity handoffs, it is important for the participating relay stations 18 and base stations 14 to have up-to-date ranging information, such that uplink or downlink communications between the mobile station 16 and one of the relay stations 18 or base stations 14 are properly received and synchronized with transmissions from other mobile stations 16.

Prior to the present invention, a separate association process was required for each participating relay station 18 and base station 14. During the association process, an initial ranging procedure had to take place prior to initiating communications. This association process has proven to be time-consuming and inefficient. In one embodiment of the present invention, a common periodic ranging process is employed to avoid the need for an association process for fast switching and macro diversity handoff scenarios. In essence, a periodic ranging process is provided by an anchoring relay station 18 or base station 14. The anchoring relay station 18 or base station 14 will then share the ranging resources with other participating relay stations 18 and base stations 14. Thus, relay stations 18 and base stations 14 that are not anchoring communications with the mobile station 16 have ranging information without employing any separate association procedure.

Figure 6:
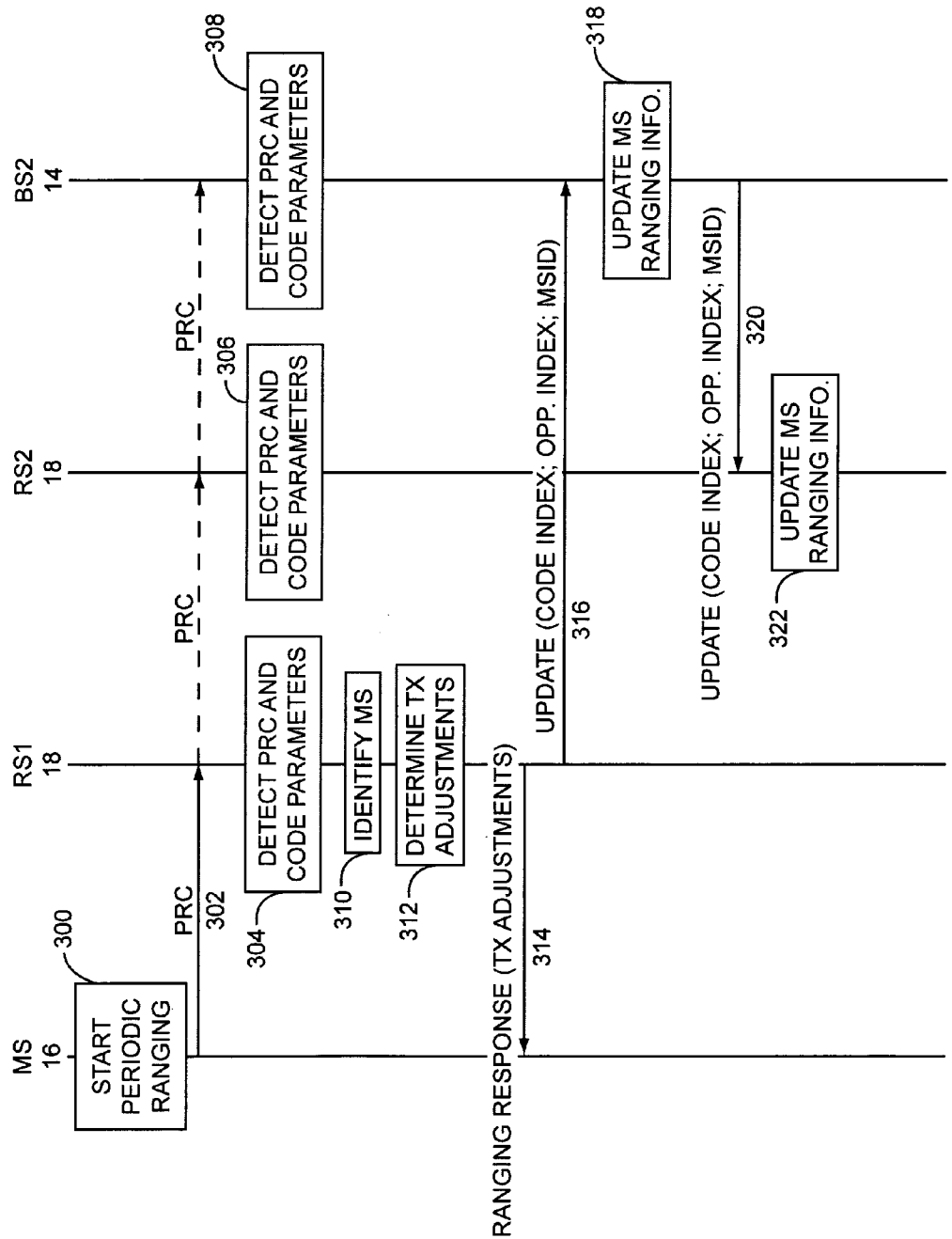
FIG. 6 is communication flow diagram illustrating a periodic ranging process according to one embodiment of the present invention.

With reference to FIG. 6, an exemplary periodic ranging procedure is provided according to one embodiment of the present invention. The mobile station 16 will start periodic ranging (step 300) by transmitting a periodic ranging code (PRC) (step 302). Assume that the periodic ranging process employs a common periodic ranging region, wherein each of the relay stations RS1 and RS2 and the base station BS2 share the ranging resources within the common periodic ranging region. In this embodiment, assume that a different periodic ranging code set of multiple periodic ranging codes is allocated for each of the relay stations RS1 and RS2 as well as for the base station BS2. Further assume that relay station RS1 is an anchor for communications with the mobile station 16, and that the periodic ranging code transmitted by the mobile station 16 is one that was selected from the periodic ranging code set assigned to the relay station RS1.

Once transmitted, the periodic ranging code is received by relay station RS1, relay station RS2, and base station BS2, which will detect the periodic ranging code and the code parameters associated with receiving the periodic ranging code (steps 304, 306, and 308). In this embodiment, relay station RS1 is able to identify the mobile station 16 that transmitted the periodic ranging code; however, the relay station RS2 and the base station BS2 are not able to identify the mobile station 16 that transmitted the periodic ranging code. The relay station RS1 is able to identify the mobile station 16 that transmitted the periodic ranging code because the relay station RS1 previously assigned that particular code to the mobile station 16, or previously scheduled transmission of the periodic ranging code by the mobile station 16. Accordingly, the relay station RS1 will identify the mobile station 16 that sent the periodic ranging code (step 310) and then determine transmission adjustments to apply for subsequent communications (step 312). The transmission adjustments are sent in a ranging response to the mobile station 16 (step 314), which will make the transmission adjustments and facilitate uplink communications accordingly.

Since the relay station RS2 and the base station BS2 are not able to identify the mobile station 16 that transmitted the periodic ranging code, the relay station RS1 will send an update message including a code index for the periodic ranging code, an opportunity index identifying the resources used to transmit the periodic ranging code, and the MSID of the mobile station 16 to the base station BS2 (step 316). The base station BS2 will update its ranging information for the mobile station 16 based on information provided by the relay station RS1 (step 318). The base station BS2 will then send a similar update including the code index, opportunity index, and MSID that is associated with the periodic ranging code received at relay station RS1 to relay station RS2 (step 320). Relay station RS2 will update its ranging information for the mobile station 16 (step 322). The relay station RS2 and base station BS2 will now be able to identify the mobile station 16 that is associated with transmitting the periodic ranging codes, and will be better prepared to participate in fast switching and macro diversity handoff scenarios.

In many fast switching scenarios, the mobile station 16 analyzes channel conditions associated with downlink communications from different relay stations 18 or base stations 14, and determines whether to switch from one to another based on the channel conditions. Although base stations 14 can participate in fast switching with associated relay stations 18, the following discussion focuses on fast switching between two relay stations RS1 and RS2 for clarity and conciseness. In general, a channel quality indication (CQI) is determined by the mobile station 16 and transmitted over a previously allocated CQI channel. The CQI channel is generally allocated to the mobile station 16 by the relay station 18 (or base station 14) that is currently anchoring communications with the mobile station 16. The participating relay stations 18 and base stations 14 that are associated with the anchoring relay station 18 (or base station 14) are called member stations.

Figure 7:
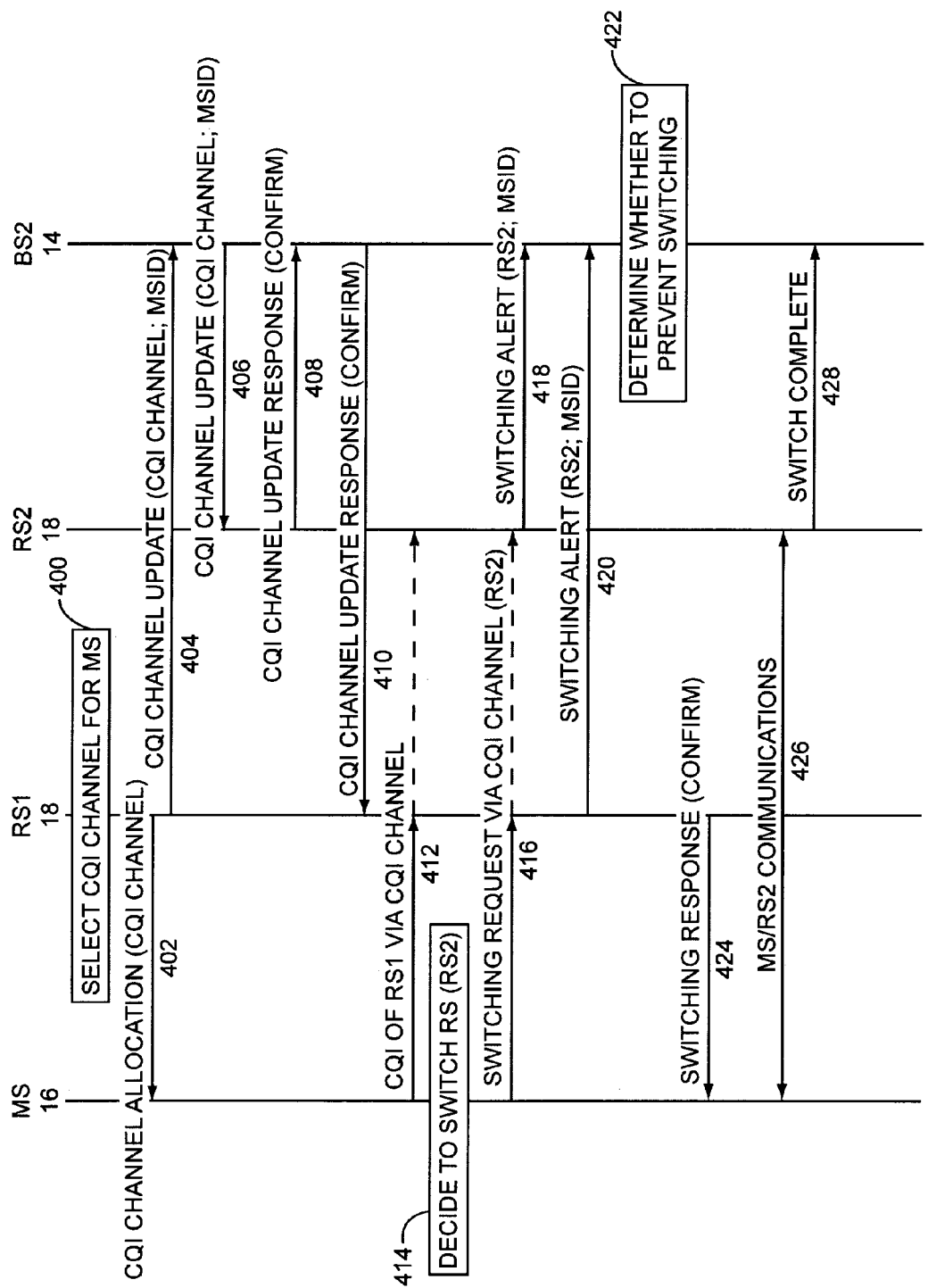
FIG. 7 is communication flow diagram illustrating an intra-cell fast switching process employing a synchronized channel quality indicator channel according to one embodiment of the present invention.

In one embodiment, the CQI assignment is synchronized among the participating relay stations 18 and base stations 14. The process is best illustrated in association with the communication flow of FIG. 7. Initially, assume an anchoring relay station RS1 selects a CQI channel for use by the mobile station 16 (step 400) and transmits a CQI channel allocation identifying the selected CQI channel to the mobile station 16 (step 402). To synchronize the CQI channel assignment, the anchoring relay station RS1 will send a CQI channel update identifying the CQI channel allocated for the mobile station 16 and the MSID of the mobile station 16 to the base station 14 (step 404). The base station BS2 will send a similar CQI channel update to the relay station RS2 (step 406). The relay station RS2 will make note of the CQI channel being used by the mobile station 16 and provide a CQI channel update response to confirm receipt of the CQI channel information to the base station BS2 (step 408). The base station BS2 will also send a CQI channel update response to the anchoring relay station RS1 to indicate that the CQI channel information has been provided to the relay station RS2 (step 410).

During this time, the mobile station 16 will monitor the channel quality of the link between the mobile station 16 and the anchoring relay station RS1, and will transmit a corresponding channel quality indicator via the allocated CQI channel (step 412). The channel quality indicator may be received and monitored by the anchoring relay station RS1 as well as the relay station RS2. The mobile station 16 will also monitor the channel quality associated with the relay station RS2. The mobile station 16 will monitor the channel quality of the links with the anchor relay station RS1 and the relay station RS2, and at some point, the channel quality associated with the link with relay station RS2 will become better than that of the link associated with the anchor relay station RS1. At this point, the mobile station 16 may decide to switch communications from the anchor relay station RS1 to the relay station RS2 (step 414). Accordingly, the mobile station 16 will send a switching request via the allocated CQI channel to indicate the desire to switch communications from the anchoring relay station RS1 to relay station RS2 (step 416). The switching request may be received by the anchoring relay station RS1 and relay station RS2, and in response, the anchoring relay station RS1 and relay station RS2 will send switching alert messages indicating the desire of the mobile station 16 to switch from the anchoring relay station RS1 to relay station RS2 (steps 418 and 420). Notably, the switching alert message will identify at least the relay station RS2 to which communications are to be switched, and the MSID of the mobile station 16.

The base station BS2 may determine whether to prevent the mobile station 16 from switching communications from the anchoring relay station RS1 to relay station RS2 (step 422). If the base station BS2 does not intervene to prevent switching, the anchoring relay station RS1 will send a switching response to indicate that switching from the anchoring relay station RS1 to relay station RS2 is authorized (step 424). At this point, the mobile station 16 and the relay station RS2 begin supporting communications, and thus the relay station RS2 becomes the anchoring relay station (step 426). Once communications are established with relay station RS2, relay station RS2 may send a message indicating that the switch has been completed to the base station BS2 (step 428). With this embodiment, the targeted (relay or base) station to which communications are being switched is notified of the desire to switch by the mobile station 16 as the currently anchoring (relay or base) station.

In an embodiment, a control system of the relay station 18 may be adapted to ignore ranging codes transmitted by the mobile station 16 via ranging resources of the second ranging region for the ranging function. In further embodiments, a control system of the relay system 18 may be adapted to ignore ranging codes transmitted by the mobile station 16 via ranging resources outside of the first ranging region for the first ranging function. In further embodiments, a control system of the base station 14 may be adapted to ignore ranging codes transmitted by the mobile station 16 via ranging resources outside of the unique base station ranging region allocated for the base station 14.

Figure 8:
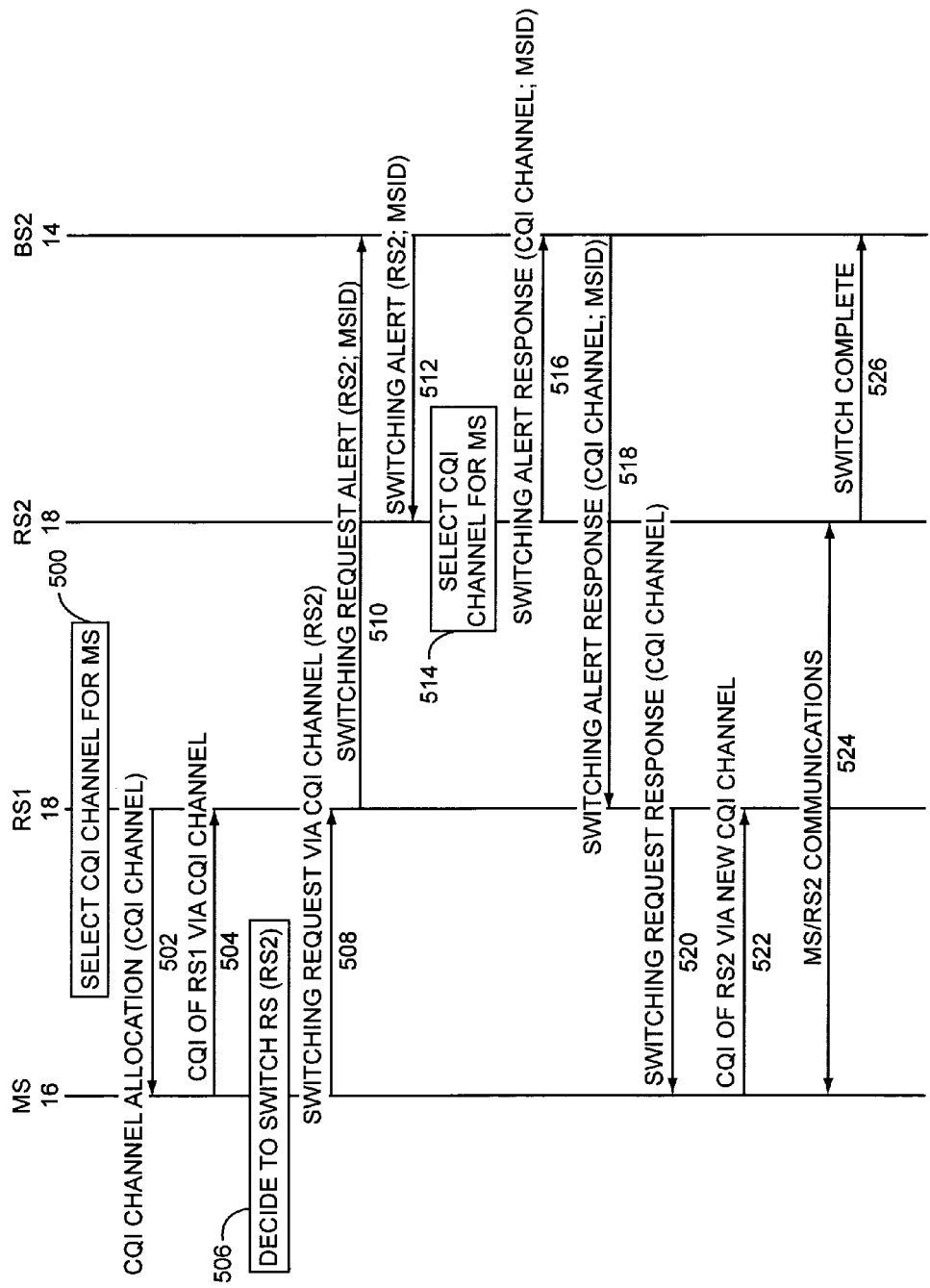
FIG. 8 is communication flow diagram illustrating an intra-cell fast switching process employing a non-synchronized channel quality indicator channel according to one embodiment of the present invention.

With reference to FIG. 8, a communication flow is illustrated wherein the CQI channel is not synchronized. Initially, an anchoring relay station RS1 selects a CQI channel for use by the mobile station 16 (step 500). The CQI channel is assigned to the mobile station 16 via a CQI channel allocation message (step 502), wherein the mobile station 16 will provide channel quality indicators via the CQI channel to the anchoring relay station RS1 (step 504). As above, the mobile station 16 will monitor channel quality associated with links with the anchoring relay station RS1 and the relay station RS2, and at some point will decide to switch communications from the anchoring relay station RS1 to relay station RS2 (step 506). The mobile station 16 will send a switching request via the CQI channel to the anchoring relay station RS1 (step 508). The anchoring relay station RS1 will send a switching request alert identifying the targeted relay station RS2 and the mobile station 16 to the base station BS2 (step 510). The base station BS2 will send a switching alert to the targeted relay station RS2 and identify the mobile station 16 using the MSID for the mobile station 16 (step 512). The targeted relay station RS2 will select a CQI channel for the mobile station 16 to use when reporting channel quality to the targeted relay station RS2 (step 514). The relay station RS2 will then send a switching alert response back to the base station BS2, wherein the switching alert response including the selected CQI channel and the MSID for the mobile station 16 (step 516). In response, the base station BS2 will send a switching alert response message to the currently anchoring relay station RS1 (step 518). Again, the switching alert response message will include the CQI channel for the mobile station 16 to use for providing CQI to the targeted relay station RS2. The anchoring relay station RS1 will send a switching request response including the new CQI channel to the mobile station 16 (step 520). At this point, the mobile station 16 will provide a CQI for the channel quality associated with the link with relay station RS2 via the new CQI channel (step 522). During this time, the mobile station 16 will switch communications from the relay station RS1 to the relay station RS2, which is not the anchoring relay station for communications (step 524). The relay station RS2 may send a switch complete message to the base station BS2 to indicate that communications have been switched from relay station RS1 to relay station RS2 (step 526). From the above, CQI channel allocation may be employed to enhance fast switching techniques among associated relay stations 18 and base stations 14.

Figure 9:
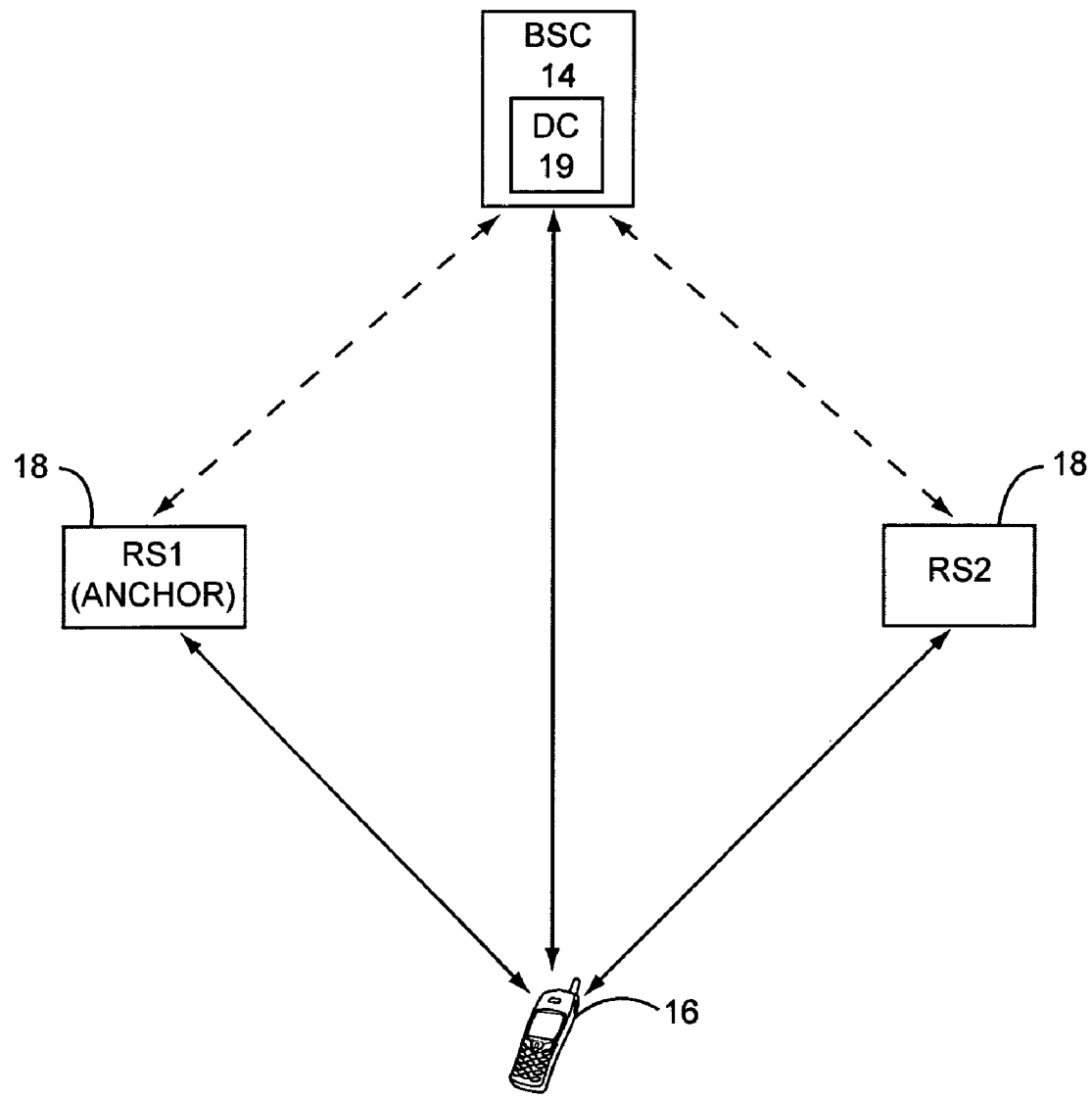
FIG. 9 is a wireless communication environment where a diversity controller is provided in the base station according to one embodiment of the present invention.

Macro diversity may take on various configurations depending on the location of the relay stations 18 relative to the associated base station 14 and the mobile station 16 being served. With reference to FIG. 9, uplink or downlink macro diversity may be provided between relay station RS1 and relay station RS2, as well as with base station 14. Uplink or downlink communications associated with the relay station RS1 are relayed between the relay station RS1 and the base station 14. Similarly, communications between relay station RS2 and the mobile station 16 are relayed between the relay station RS2 and the base station 14. As noted, uplink and downlink communications may be supported directly by the base station 14 as well. For downlink communications, the base station 14 will send the same data to be transmitted to the mobile station 16 to the relay station RS1 and the relay station RS2, and at a certain time on a given channel, the relay station RS1, relay station RS2, and base station 14 may transmit the same information to the mobile station 16, which will receive the downlink transmission and combine them to recover the transmitted information. The relay or base stations 18, 14 participating in macro diversity for a given mobile station 16 define a macro diversity set. Generally, the anchoring station, which is illustrated as being relay station RS1, will provide a diversity control function. With the present invention, the diversity control function is provided in a diversity controller (DC) 19, which need not be in the relay or base station 18, 14 that is the anchor station. As illustrated in FIG. 9, the diversity controller 19 is provided in the base station 14, even though relay station RS1 acts as an anchor station for the mobile station 16. Thus, the primary link for communications is between relay station RS1 and the mobile station 16; however, the mobile station 16 may combine transmissions from the relay station RS1, the relay station RS2, and the base station 14. Similarly, transmissions from the mobile station 16 may be received by the relay station RS1 and relay station RS2, and forwarded to the base station 14, wherein the base station 14 will combine the transmissions received via the relay stations RS1 and RS2 as well as those received directly at the base station 14 to recover the transmitted information. Notably, the initial and periodic ranging techniques described above can be used to identify the participating relay stations 18 and base stations 14, in a macro diversity (or handoff) set.

Figure 10:
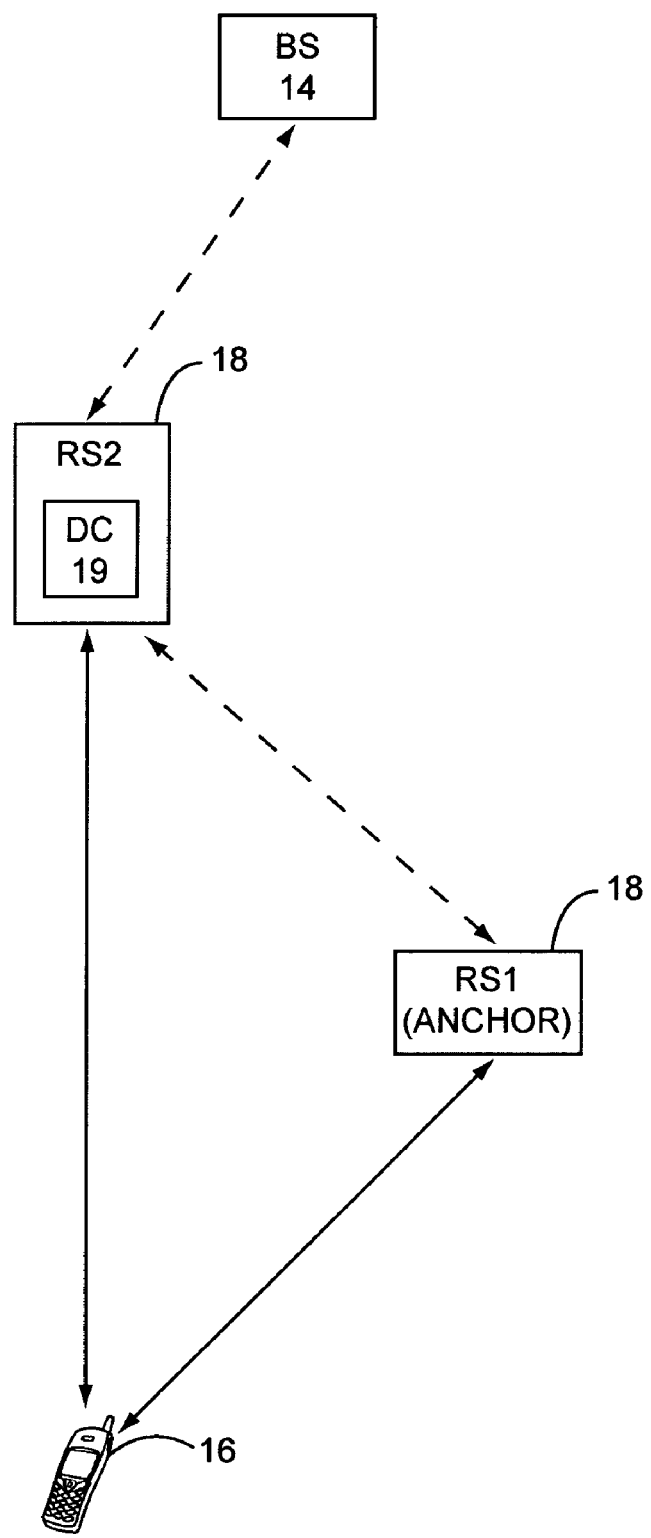
FIG. 10 is a wireless communication environment where a diversity controller is provided in a relay station apart from the relay station that is anchoring the mobile station according to one embodiment of the present invention.

Preferably, the diversity controller 19 is provided in the base station 14 for the macro diversity set, or the relay station 18 that is closest to the base station 14 in the macro diversity set, as illustrated in FIGS. 9 and 10, respectively. In FIG. 10, the relay station RS2 can actually transmit information intended for the mobile station 16 via relay station RS1, which as illustrated, acts as an anchor station for the mobile station 16. For uplink macro diversity, transmissions from the mobile station 16 are received by relay station RS1 and relay station RS2. Relay station RS1 will forward the received information to relay station RS2, which will combine the information to recover the transmitted information, and then provide the transmitted information to the base station 14. For downlink communications, the diversity controller 19 of the relay station RS2 may send information to be transmitted to the mobile station 16 to the relay station RS1, and at a defined time and over an appropriate channel, both the relay station RS2 and the relay station RS1 will transmit information to the mobile station 16. Thus, the diversity controller 19 is responsible for multicasting downlink communications to any downstream relay stations 18 and to the mobile station 16, as well as combining direct transmissions for uplink communications. Again, the diversity controller 19 is preferably provided in the base station 14 itself or in the relay station 18 that is closest to the base station 14 of the macro diversity set, regardless of the anchoring relay or base station. Further, the relay station 18 or base station 14 that provides the diversity controller 19 may control the scheduling of uplink and downlink communications for the mobile station 16. As the mobile station 16 moves, the diversity controller 19 allocated to the mobile station 16 may move from station to station.

The base station 14 may always provide the diversity controller 19. However, if the diversity controller 19 is not in the base station 14, the diversity controller 19 may be provided in the anchor relay station 18, which may be employed to schedule uplink and downlink transmissions. Alternately, the anchor relay station 18 may schedule transmissions and then inform the diversity controller 19, which may be located in the same or in a different relay station 18. In general, the anchor station is the station from which the mobile station 16 receives the strongest downlink signal.

Figure 11:
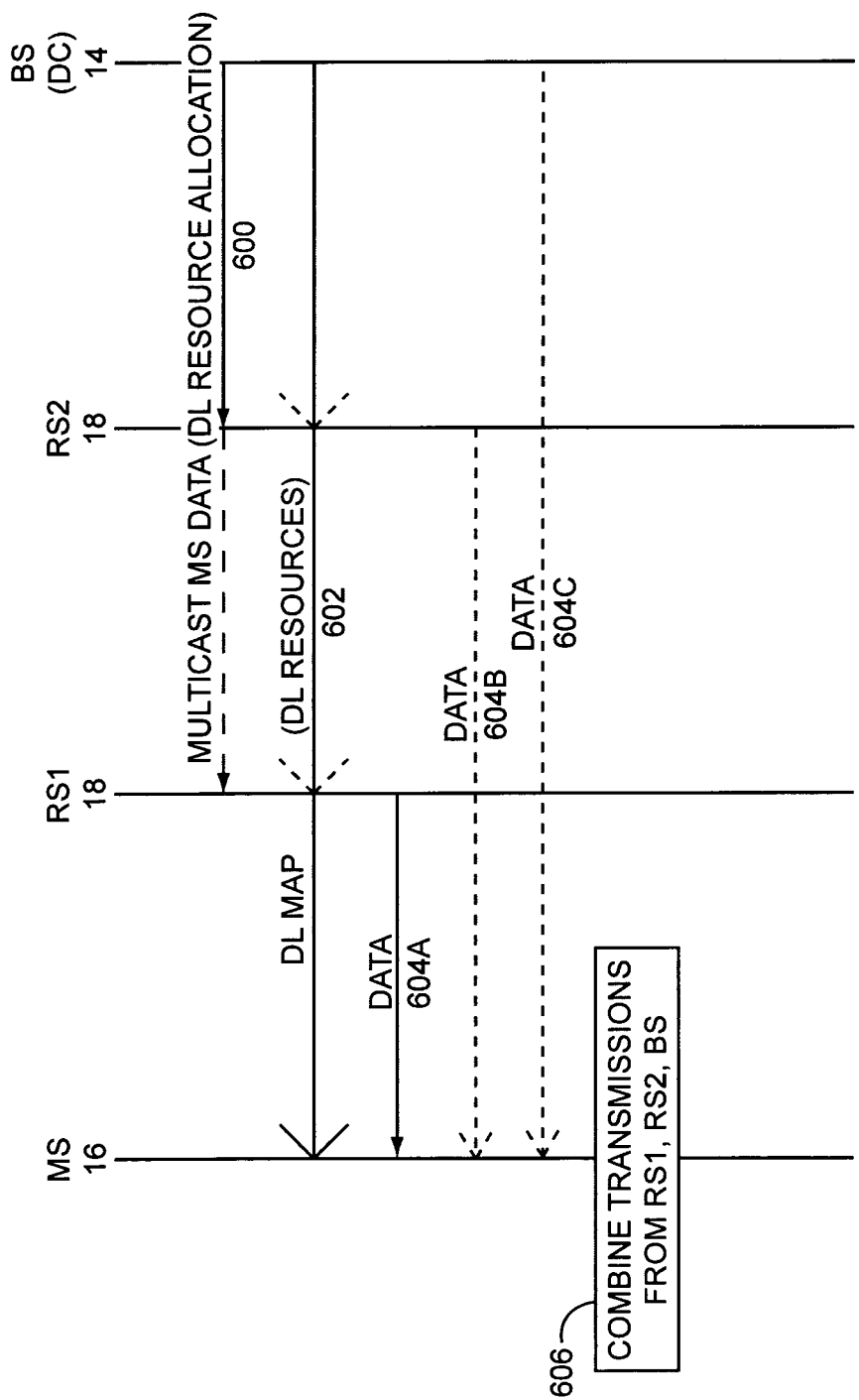
FIG. 11 is communication flow diagram illustrating macro-diversity for downlink communications according to one embodiment of the present invention.

With reference to FIG. 11, a communication flow is provided to illustrated downlink communications in a macro diversity scenario for the communication environment of FIG. 9. Initially, assume the diversity controller 19 is located in the base station 14, and relay station RS1 is an anchor station for the mobile station 16. The diversity controller 19 of the base station 14 will multicast data intended for the mobile station 16 to the relay stations RS1 and RS2 (step 600). The multicast may also include information identifying a resource allocation for the downlink communications, and as such, the relay stations RS1 and RS2 will be informed of the resources to use when transmitting the data to the mobile station 16. The diversity controller 19 of the base station 14 may also send a downlink (DL) map, which identifies the downlink resources that will be used for transmissions to the mobile station 16 by the relay stations RS1 and RS2, and perhaps the base station 14 (step 602). At the appropriate time and using the appropriate channel in light of any transmission adjustments from prior ranging operations, relay station RS1, relay station RS2, and the base station 14 may transmit the same data to the mobile station 16 (steps 604A, 604B, and 604C). the mobile station 16 will receive these transmissions at substantially the same time and combine the transmissions from relay station RS1, relay station RS2, and the base station 14 to recover the transmitted information (step 606).

Figure 12:
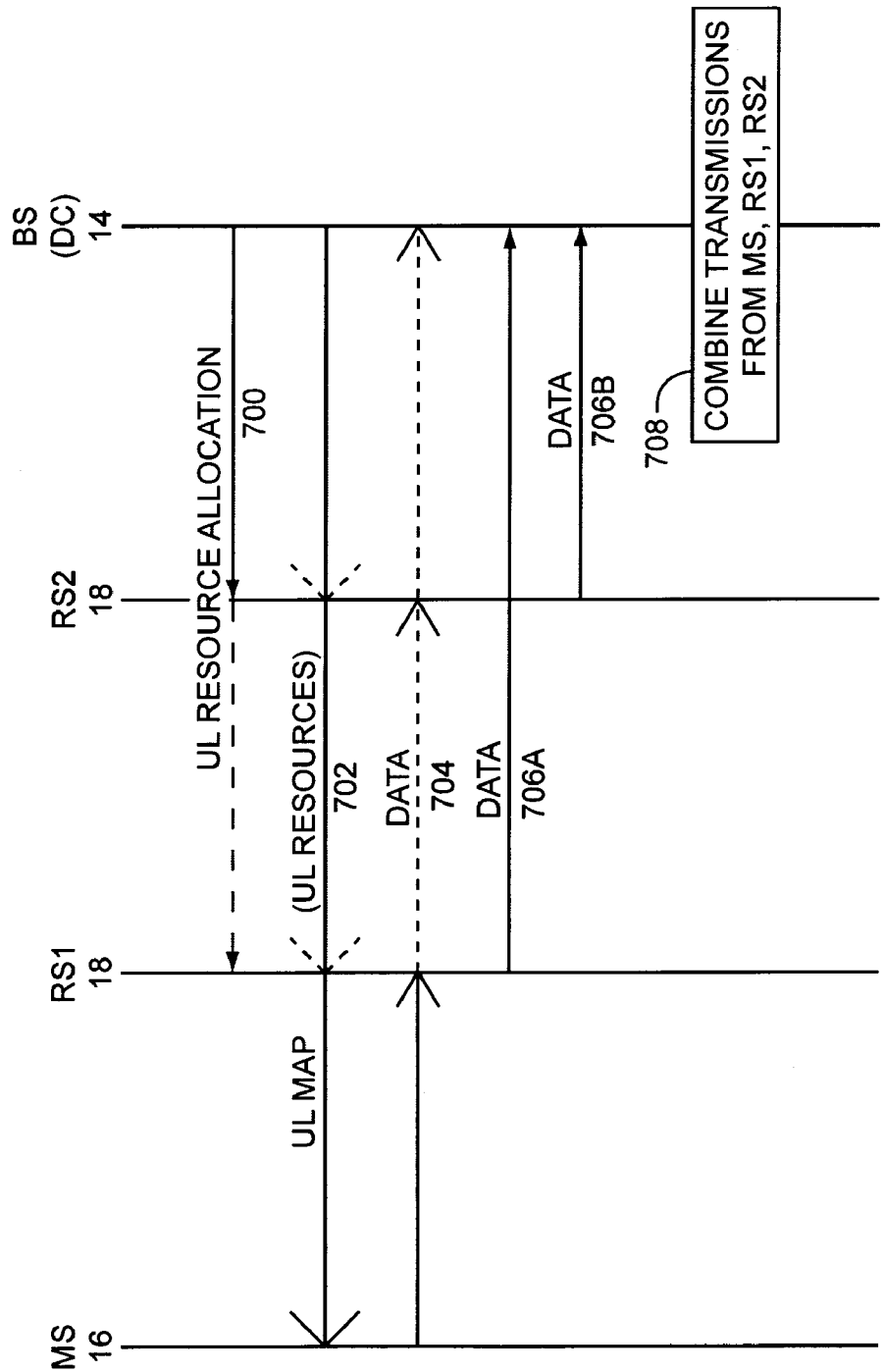
FIG. 12 is communication flow diagram illustrating macro-diversity for uplink communications according to one embodiment of the present invention.

With reference to FIG. 12, an uplink communication scenario is illustrated for the macro diversity of FIG. 9. Again, the diversity controller 19 is provided in the base station 14, and relay station RS1 is an anchor station for the mobile station 16. Initially, the base station 14 will provide uplink resource allocations for the transmissions for the mobile station 16 to the relay stations RS1 and RS2 (step 700). The base station 14 will also send an uplink (UL) map message identifying the uplink resources that will be used by relay stations RS1 and RS2, and perhaps the base station 14 to the mobile station 16 (step 702). The mobile station 16 will then transmit data at the allocated time and over the allocated channel (step 704). The transmitted data may be received by the relay station RS1, relay station RS2, and the base station 14. Accordingly, the relay station RS1 will forward the data received from the mobile station 16 to the base station 14 (step 706A). The relay station RS2 will send the data it received from the mobile station 16 to the base station 14 (step 706B). At this point, the base station 14 will combine the data from the transmissions received from relay stations RS1 and RS2, as well as directly at the base station 14 to recover the information transmitted by the mobile station 16 (step 708).

Another embodiment of the present invention relates to implementation of an improved error control technique. In particular, an automatic repeat request (ARQ) mechanism and a hybrid ARQ mechanism cooperate to provide efficient retransmission of data. In general, ARQ is an error control method for data transmission systems, and employs acknowledgement messages and timeout mechanisms to ensure that all data that is transmitted is properly received. Typically, an acknowledgement message is sent by a receiver to the transmitter to indicate that each data packet is correctly received. Generally, when the transmitter does not receive an acknowledgement before a timeout occurs, the transmitter will retransmit the frame. The receiver may send a negative acknowledgement if it is determined that a packet is not properly received, or is lost. Hybrid ARQ is a variant of ARQ, and generally employs some type of coding within each data packet to indicate whether or not the data packets were properly received. For example, each packet may be encoded with an error correction code. As the packets are received, they are analyzed in light of the error correction code to determine whether or not each of the packets was received. If a packet must be retransmitted, the receiver may request retransmission of the packet.

In a communication environment employing relay stations 18, multiple hops are required to reach a mobile station 16 from a base station 14. Generally, the hops from a base station 14 to a relay station 18 and between relay stations 18 are relatively reliable. The least reliable hop is between the last relay station 18 in the path and the mobile station 16. In many instances, the probability of a failed transmission attempt is very high in this last hop due to the changing channel conditions associated with the mobility of the mobile station 16. When employing basic ARQ techniques when relay stations 18 are employed, the base station 14 must re-send data through the relay stations 18 to the mobile station 16, even though the only failed link is between the last relay station 18 and the mobile station 16. Thus, significant resources are wasted by retransmitting the packets from the base station 14 to the last relay station 18 in the forwarding path.

Figure 13:
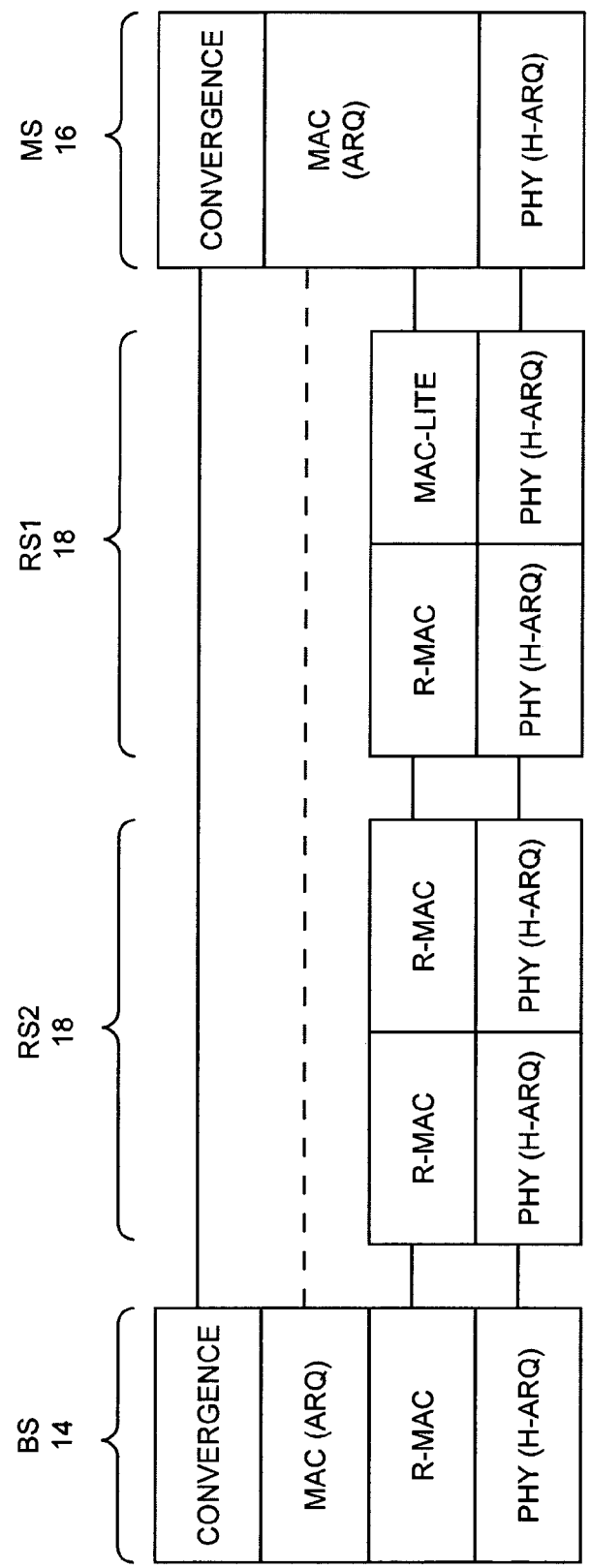
FIG. 13 is a protocol stack according to one embodiment of the present invention.

For the present invention, ARQ is employed at a MAC, or layer 2, level, while hybrid ARQ is employed at a physical, or layer 1, level. Further, ARQ is performed on an end-to-end basis across multiple links between entities, wherein hybrid ARQ is performed on a per-link basis. With reference to FIG. 13, an exemplary protocol stack is illustrated in which the cooperation of ARQ and hybrid ARQ is provided. The physical layer (layer 1) employs hybrid ARQ for retransmission control on a per-link basis. As such, an individual hybrid ARQ retransmission process is provided between the base station 14 and the relay station RS2; between the relay station RS2 and the relay station RS1; and between the relay station RS1 and the mobile station 16. Above the physical layer resides a MAC layer in which ARQ retransmission control is provided. Notably, ARQ retransmission techniques may be provided between the base station 14 and the mobile station 16 at the MAC layer. Within the MAC layer, an R-MAC layer is provided for the base station 14, relay station RS2, and relay station RS1. The relay station RS1 may also employ a MAC-lite layer to facilitate an ARQ process with the mobile station 16. The R-MAC layers of the base station 14, relay station RS2, and relay station RS1 may be employed to provide ARQ processes between the base station 14 and the relay station RS2, as well as between relay station RS2 and relay station RS1, depending on the configuration of the embodiment.

In one embodiment, the last relay station 18, which is the one communicating directly with the mobile station 16, will keep track of the service data unit sequence numbers (SDU_SN) associated with each packet data unit (PDU) or PDU_SN, or the like, that is received. When the mobile station 16 realizes that a PDU is lost or corrupted, the mobile station 16 will send a negative acknowledgement message to the base station 14. After the base station 14 receives the ARQ or the negative acknowledgement, the base station 14 may send a retransmission request identifying the SDU_SNs associated with the PDUs to be retransmitted to the last relay station 18, and perhaps scheduling information for retransmitting the PDUs. The last relay station 18 will send a retransmission response indicating whether or not the PDUs to be retransmitted are still available at the last relay station 18. If the PDUs are available at the last relay station 18, the last relay station 18 will retransmit those PDUs to the mobile station 16. Otherwise, the base station 14 will retransmit the PDUs to be retransmitted directly or indirectly to the last relay station 18, which will then retransmit the PDUs to the mobile station 16. The messages exchanged between the base station 14 and the last relay station 18 may identify the communication or call using a communication ID (CID) as well as the SDU_SNs for the PDUs that need to be retransmitted. Further, the last relay station 18 may identify the SDU_SNs for both the available and the unavailable PDUs at the last relay station 18.

Figure 14A:
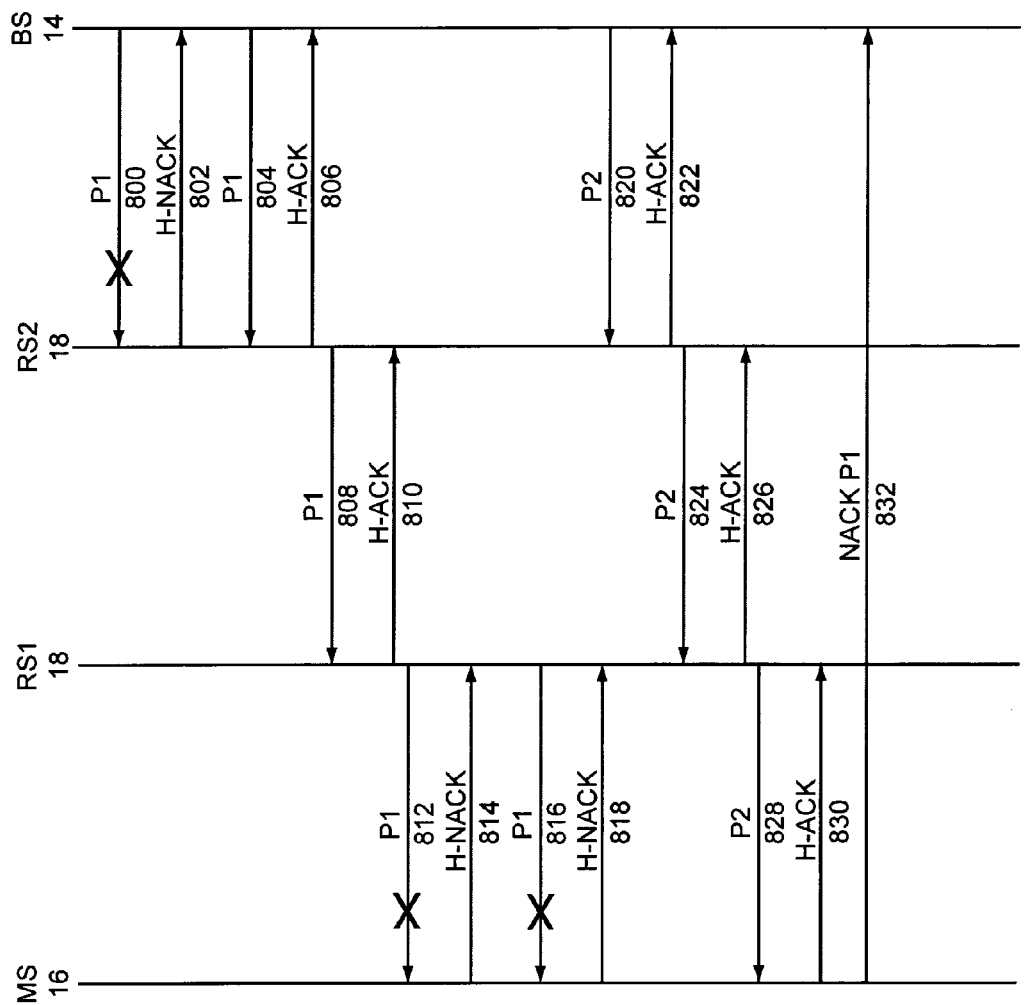
FIGS. 14A and 14B are a communication flow diagram illustrating a first retransmission control process according to one embodiment of the present invention.
Figure 14B:
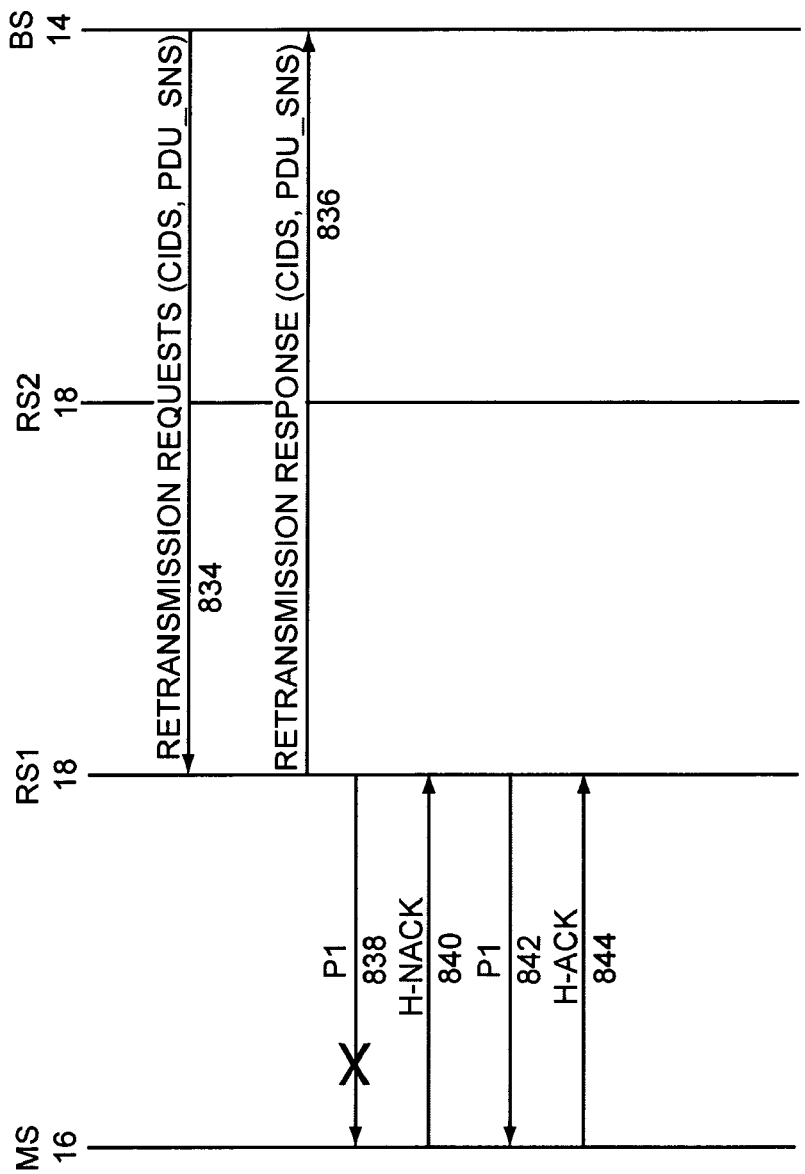

With reference to FIGS. 14A and 14B, an exemplary communication flow is provided to illustrate cooperation of ARQ and hybrid ARQ according to one embodiment. Initially, assume PDU P1 is transmitted from the base station 14 to relay station RS2 in an effort to deliver the PDU P1 to the mobile station 16 (step 800). Assume that the relay station RS2 did not receive the PDU P1, and using a hybrid ARQ retransmission technique, determined that the PDU P1 was lost or not properly detected, as indicated by the X. In response, the relay station RS2 will send a hybrid negative acknowledgement message (H-NACK) back to the base station 14 via the physical layer (step 802). In response, the base station 14 will retransmit PDU P1 (step 804). Assuming that the relay station RS2 properly received PDU P1, a hybrid acknowledgement message (H-ACK) is transmitted to the base station 14 via the physical layer (step 806). Assuming that relay station RS1 is the last relay station in the downlink path, relay station RS2 will forward the PDU P1 to the relay station RS1 (step 808). If RS1 properly receives the PDU P1, an H-ACK is sent back to relay station RS2 at the physical layer (step 810).

At this point, the relay station RS1 has received PDU P1, and will attempt to transmit the PDU P1 to the mobile station 16 (step 812). Assume that the PDU P1 was not properly received. The mobile station 16 is able to determine that the PDU P1 was not properly received, and sends an H-NACK back to the relay station RS1 via the physical layer to indicate that the PDU P1 was not properly received (step 814). The relay station RS1 may attempt to retransmit the PDU P1 automatically in response to receiving the H-NACK (step 816). Further assume that the PDU P1 is not received during retransmission, and as such the mobile station 16 provides another H-NACK back to the relay station RS1 via the physical layer (step 818).

During this time, assume that the base station 14 attempts to send a second PDU P2 to relay station RS2 for ultimate delivery to the mobile station 16 (step 820). If the PDU P2 is properly received, the relay station RS2 will send an H-ACK back to the base station 14 via the physical layer (step 822). The relay station RS2 will then forward the PDU P2 to the relay station RS1 (step 824), wherein if the PDU P2 is properly received, an H-ACK is sent back to the relay station RS2 via the physical layer (step 826). Next, the relay station RS1 will attempt to transmit the PDU P2 to the mobile station 16 (step 828). Assuming that the PDU P2 is properly received by the mobile station 16, an H-ACK is sent back to the relay station RS1 via the physical layer (step 830).

At this point, the mobile station 16 may look at the SDU_SN of the PDU P2 and recognize that PDU P1 was not received. As such, the mobile station 16 may send a negative acknowledgement message (NACK) indicating that PDU P1 was not received via the MAC layer (step 832). The NACK may include the sequence numbers for the PDUs that were not received, including PDU P1. The base station 14 will respond by sending a retransmission request to the relay station RS1 directly or via relay station RS2 (step 834). The retransmission request will include the communication IDs as well as the sequence numbers for the PDUs to be retransmitted. The relay station RS1 will acknowledge receipt of the retransmission request and identify the sequence numbers for the PDUs it has available for retransmission in a retransmission response, which is sent back to the base station 14 (step 836).

At this point, the relay station RS1 will attempt to retransmit the PDU P1, which has been stored since its receipt from the relay station RS2 (at step 808) to the mobile station 16 (step 838). If the PDU P1 is not properly received, the mobile station 16 may detect this and send an H-NACK back to the relay station RS1 via the physical layer (step 840). The relay station RS1 may attempt to retransmit the PDU P1 (step 842). Upon proper receipt, the mobile station 16 may send an H-ACK back to the relay station RS1 (step 844).

Figure 15A:
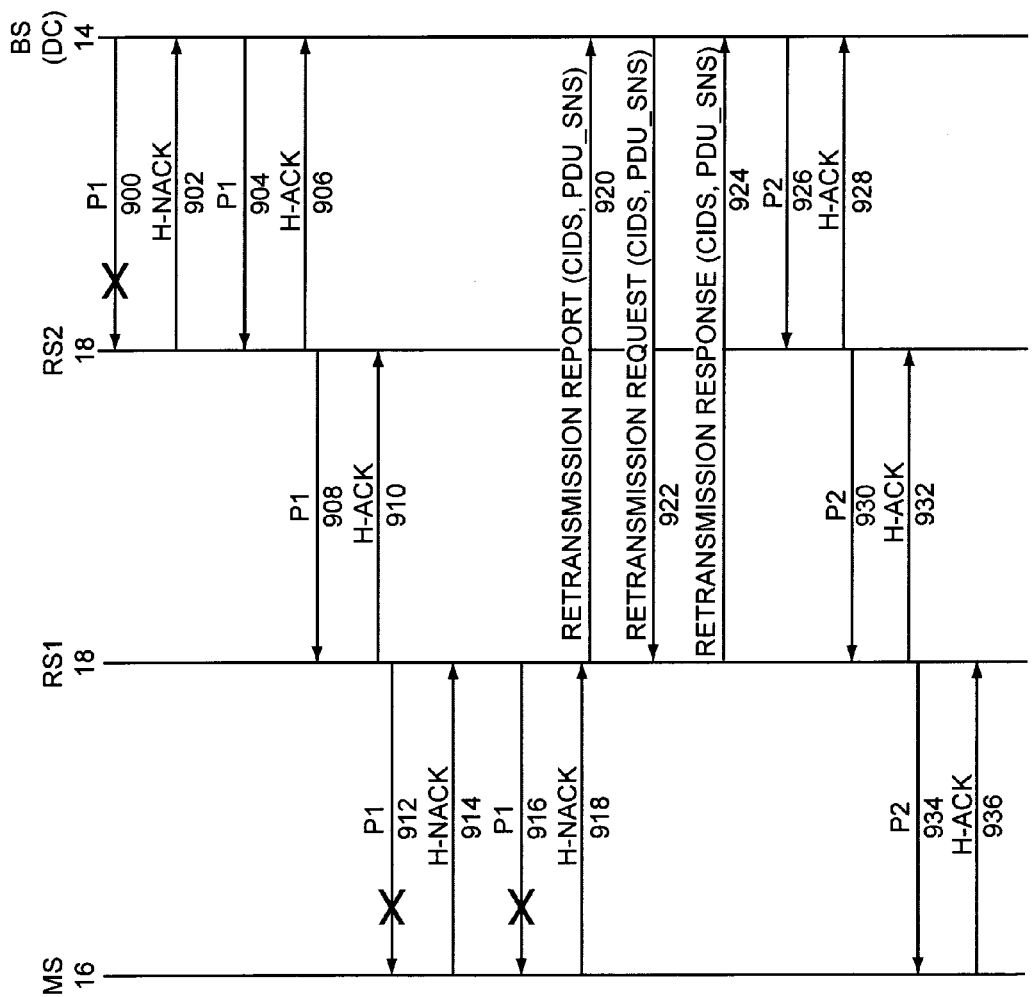
FIGS. 15A and 15B are a communication flow diagram illustrating a second retransmission control process according to one embodiment of the present invention.
Figure 15B:
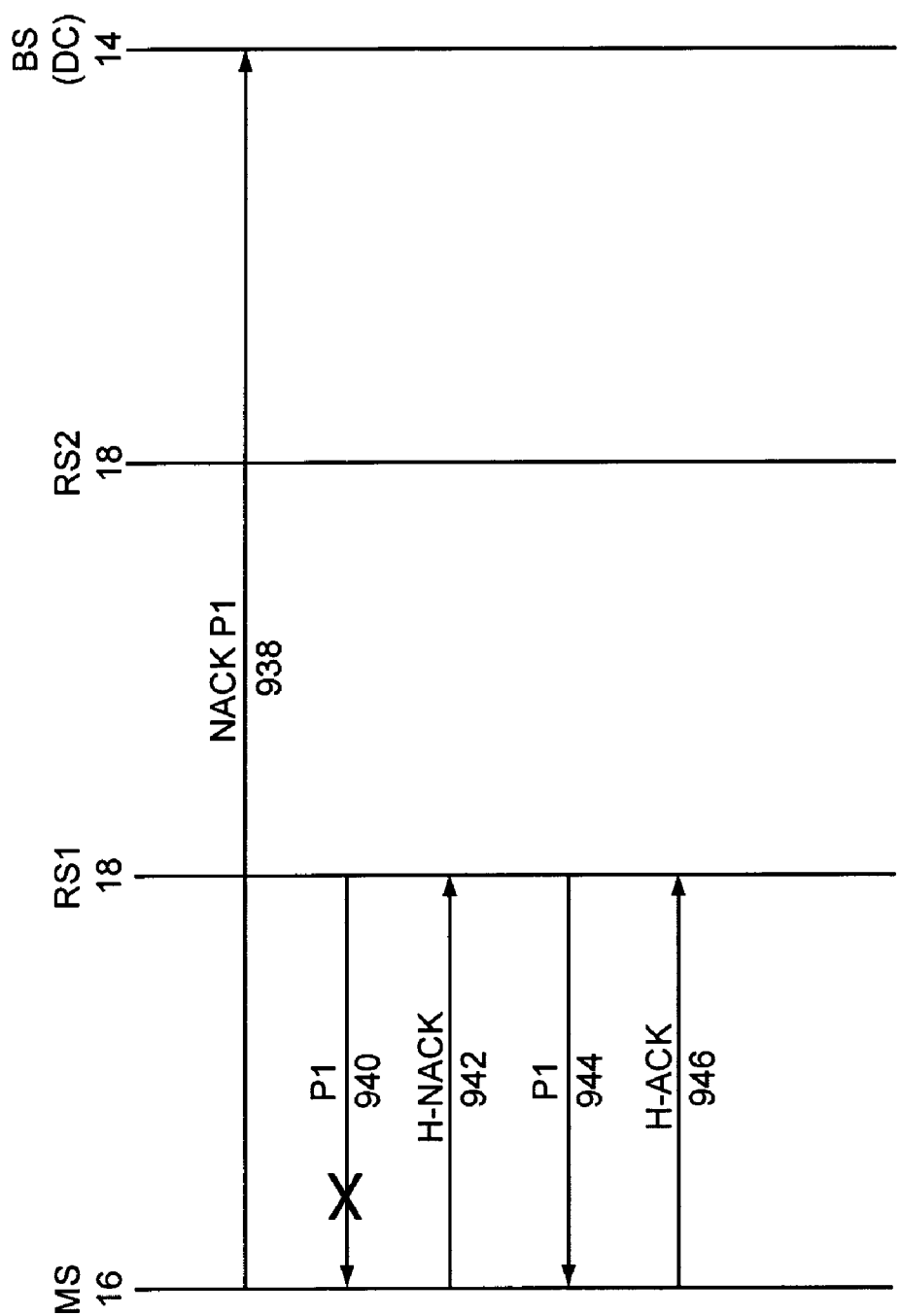

In yet another embodiment, the last relay station 18 may identify a lost PDU in response to receiving an H-NACK from the mobile station 16. In response, the last relay station 18 may send a retransmission report that identifies the lost PDUs to the base station 14. In response, the base station 14 may send a retransmission request to the last relay station 18, which will retransmit the lost PDUs. Notably, the base station 14 may ignore any subsequent ACK or NACK messages that are provided at the MAC layer. In this embodiment, authorization to retransmit lost PDUs is quickly provided to the last relay station 18. An overview of this embodiment is provided in the communication flow of FIGS. 15A and 15B.

Initially, assume PDU P1 is transmitted from the base station 14 to relay station RS2 in an effort to deliver the PDU P1 to the mobile station 16 (step 900). Assume that the relay station RS2 did not receive the PDU P1, and using a hybrid ARQ retransmission technique, determined that the PDU P1 was lost or not properly detected, as indicated by the X. In response, the relay station RS2 will send a hybrid negative acknowledgement message (H-NACK) back to the base station 14 via the physical layer (step 902). In response, the base station 14 will retransmit PDU P1 (step 904). Assuming that the relay station RS2 properly received PDU P1, a hybrid acknowledgement message (H-ACK) is transmitted to the base station 14 via the physical layer (step 906). Assuming that relay station RS1 is the last relay station in the downlink path, relay station RS2 will forward the PDU P1 to the relay station RS1 (step 908). If RS1 properly receives the PDU P1, an H-ACK is sent back to relay station RS2 at the physical layer (step 910).

At this point, the relay station RS1 has received PDU P1, and will attempt to transmit the PDU P1 to the mobile station 16 (step 912). Assume that the PDU P1 was not properly received. The mobile station 16 is able to determine that the PDU P1 was not properly received, and sends a H-NACK back to the relay station RS1 via the physical layer to indicate that the PDU P1 was not properly received (step 914). The relay station RS1 may attempt to retransmit the PDU P1 automatically in response to receiving the H-NACK (step 916). Further assume that the PDU P1 is not received during retransmission, and as such the mobile station 16 provides another H-NACK back to the relay station RS1 via the physical layer (step 918). At this point, the relay station RS1, through the H-NACK, will recognize that PDU P1 was not properly received by the mobile station 16. In response, the relay station RS1 will send a retransmission report directly or indirectly to the base station 14 (step 920). The retransmission report may identify PDU P1 directly or through a sequence number and the associated communication ID. The base station 14 may process the retransmission report and send a retransmission request to instruct the relay station RS1 to retransmit PDU P1 to the mobile station 16 (step 922). The retransmission request may identify the sequence numbers for the PDUs to be retransmitted along with the communication IDs. Notably, these messages may identify PDUs for the same or different communication IDs, and may include one or more sequence numbers for any number of PDUs. The relay station RS1 may respond by sending a retransmission response back to the base station 14 indicating that the retransmission request was received, and confirming the PDUs to be retransmitted for the corresponding communication IDs (step 924).

During this time, assume that the base station 14 attempts to send a second PDU P2 to relay station RS2 for ultimate delivery to the mobile station 16 (step 926). If the PDU P2 is properly received, the relay station RS2 will send an H-ACK back to the base station 14 via the physical layer (step 928). The relay station RS2 will then forward the PDU P2 to the relay station RS1 (step 930), wherein if the PDU P2 is properly received, an H-ACK is sent back to the relay station RS2 via the physical layer (step 932). Next, the relay station RS1 will attempt to transmit the PDU P2 to the mobile station 16 (step 934). Assuming that the PDU P2 is properly received by the mobile station 16, an H-ACK is sent back to the relay station RS1 via the physical layer (step 936).

At this point, the mobile station 16 may look at the SDU_SN of the PDU P2 and recognize that PDU P1 was not received. As such, the mobile station 16 may send a negative acknowledgement message (NACK) indicating that PDU P1 was not received via the MAC layer (step 938). Since the base station 14 has already recognized that PDU P1 was not properly received and has already sent a request instructing relay station RS1 to retransmit PDU P1 to the mobile station 16, the NACK that was received via the MAC layer may be ignored.

In response to the retransmission request, the relay station RS1 will then attempt to retransmit the PDU P1 to the mobile station 16 (step 940). If the PDU P1 is not properly received, the mobile station 16 may detect this and send an H-NACK back to the relay station RS1 via the physical layer (step 942). The relay station RS1 may attempt to retransmit the PDU P1 (step 944). Upon proper receipt, the mobile station 16 may send an H-ACK back to the relay station RS1 (step 946).

Figure 16:
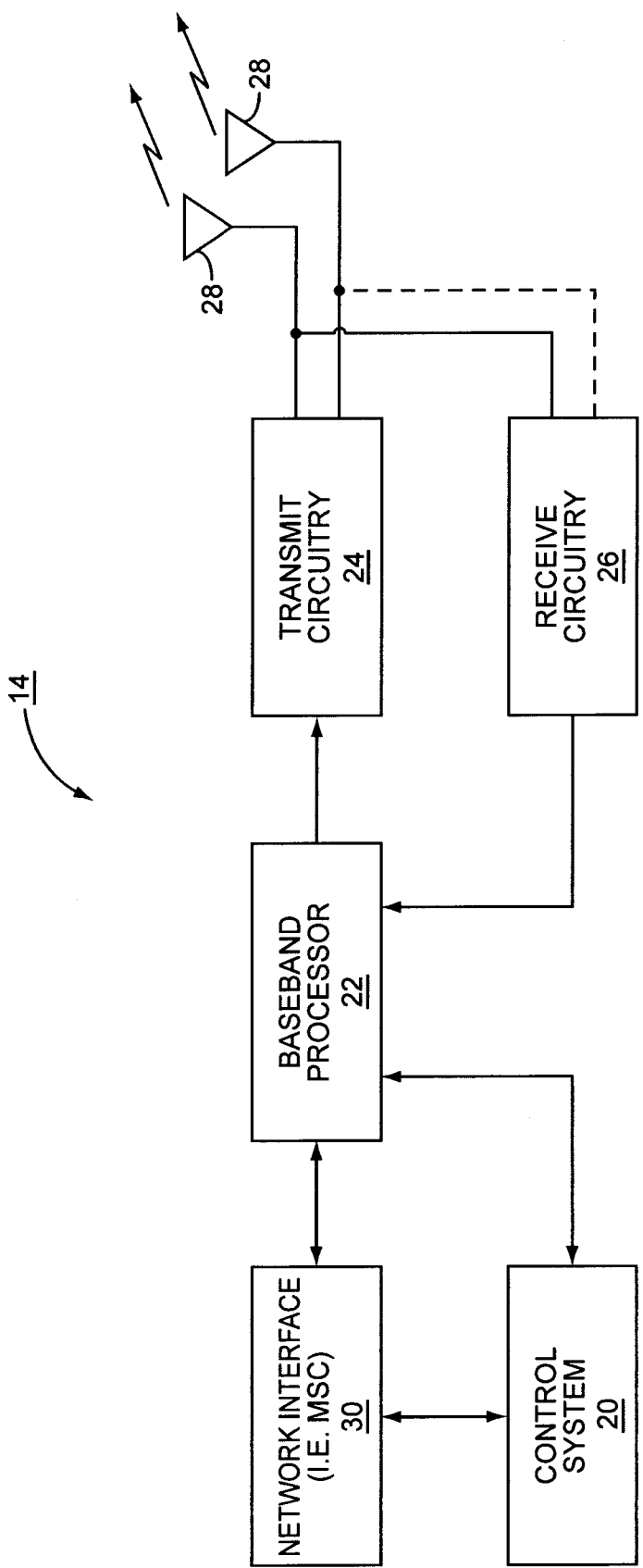
FIG. 16 is a block representation of a base station according to one embodiment of the present invention.

A high level overview of the mobile stations 16 and base stations 14 of the present invention is provided in following discussion. With reference to FIG. 16, a base station 14 configured according to one embodiment of the present invention is illustrated. The base station 14 generally includes a control system 20, a baseband processor 22, transmit circuitry 24, receive circuitry 26, one or more antennas 28, and a network interface 30. The receive circuitry 26 receives radio frequency signals bearing information from one or more remote transmitters provided by mobile stations 16 or relay stations 18. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile station 16 or relay station 18 serviced by the base station 14. The network interface 30 will typically interact with a base station controller and a circuit-switched network forming a part of the access network, which may be coupled to the public switched telephone network (PSTN) to form the carrier network 12.

On the transmit side, the baseband processor 22 receives digitized data, which may represent voice, data, or control information, from the network interface 30 under the control of control system 20, which encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

In order to allow the relay station 18 or mobile station 16 to request bandwidth or additional bandwidth, quality of service information must be provided along with the request. Quality of service information may include priority, service class, scheduling information, or the like.

Figure 17:
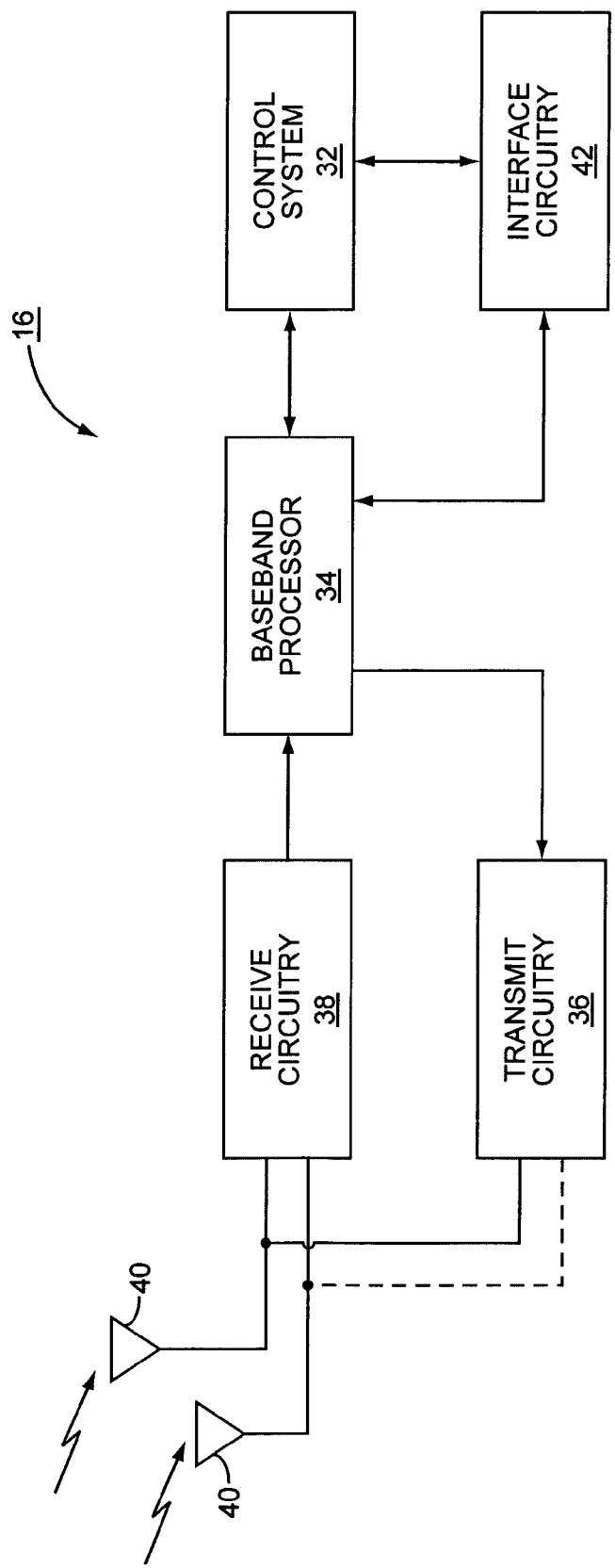
FIG. 17 is a block representation of a mobile terminal according to one embodiment of the present invention.

With reference to FIG. 17, a mobile station 16 configured according to one embodiment of the present invention is illustrated. Similarly to the base station 14, the mobile station 16 will include a control system 32, a baseband processor 34, transmit circuitry 36, receive circuitry 38, one or more antennas 40, and user interface circuitry 42. The receive circuitry 38 receives radio frequency signals bearing information from one or more base stations 14 or relay stations 18. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation generally employs an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) are implemented using digital signal processing for modulation and demodulation, respectively.

Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In the preferred embodiment, OFDM is used at least for the downlink transmission from the base stations 14 or relay stations 18 to the mobile stations 16. Further, the base stations 14 are synchronized to a common clock via GPS signaling and coordinate communications via a base station controller. Each base station 14 may be equipped with n transmit antennas 28, and each mobile station 16 is equipped with m receive antennas 40. Notably, the respective antennas can be used for reception and transmission using appropriate duplexers or switches and are so labeled only for clarity. Notably, the present invention is equally application to single antenna embodiments at the mobile station 16, relay stations 18, and the base stations 14.

Figure 18:
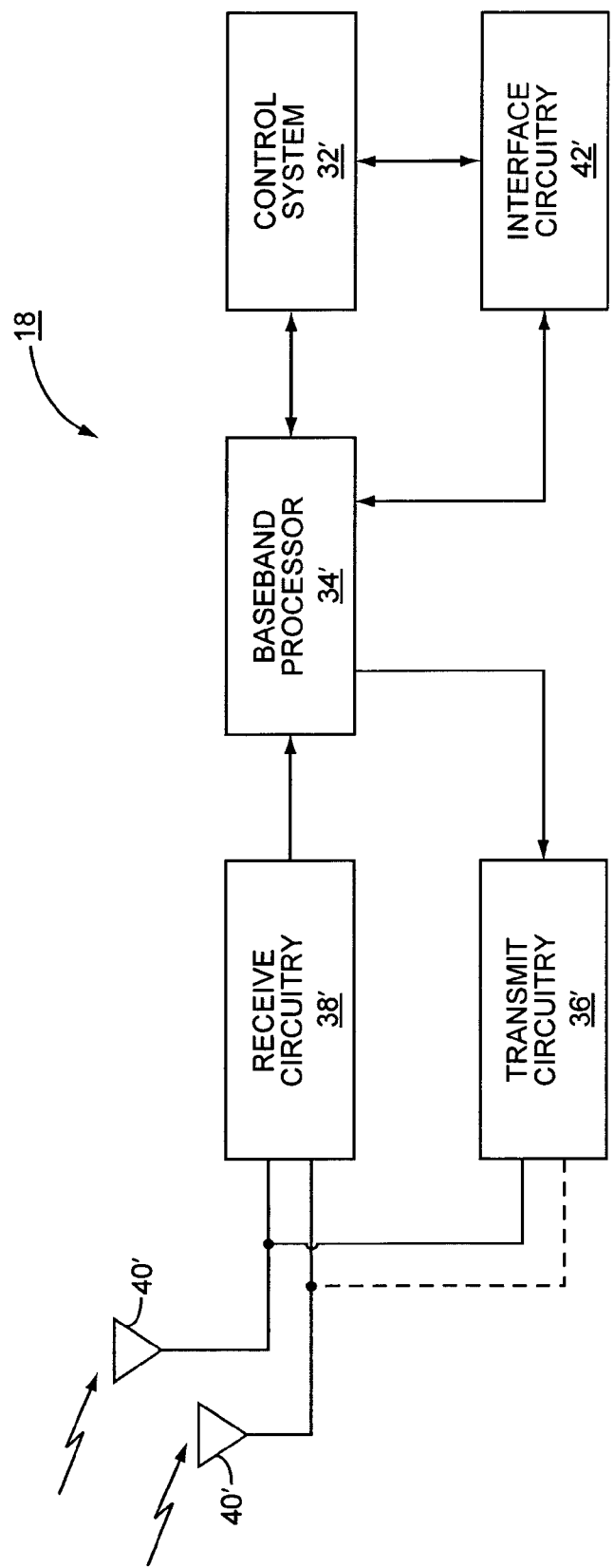
FIG. 18 is a block representation of a relay station terminal according to one embodiment of the present invention.

With reference to FIG. 18, a relay station 18 configured according to one embodiment of the present invention is illustrated. Notably, the basic architecture of a relay station 18 is very analogous to a mobile station 16 with the exception that the relay station 18 is able to communicate wirelessly with base stations 14 as well as mobile stations 16. Accordingly, the relay station 18 will include a control system 32', a baseband processor 34', transmit circuitry 36', receive circuitry 38', one or more antennas 40', and user interface circuitry 42'. The receive circuitry 38' receives radio frequency signals bearing information from one or more base stations 14 or mobile stations 18 and the transmit circuitry 36' transmits radio frequency signals to one or more base stations or mobile stations. The baseband processor 34' and control system 32' operate in a fashion similar to the corresponding elements of the mobile station 16 and the base station 14.

Figure 19:
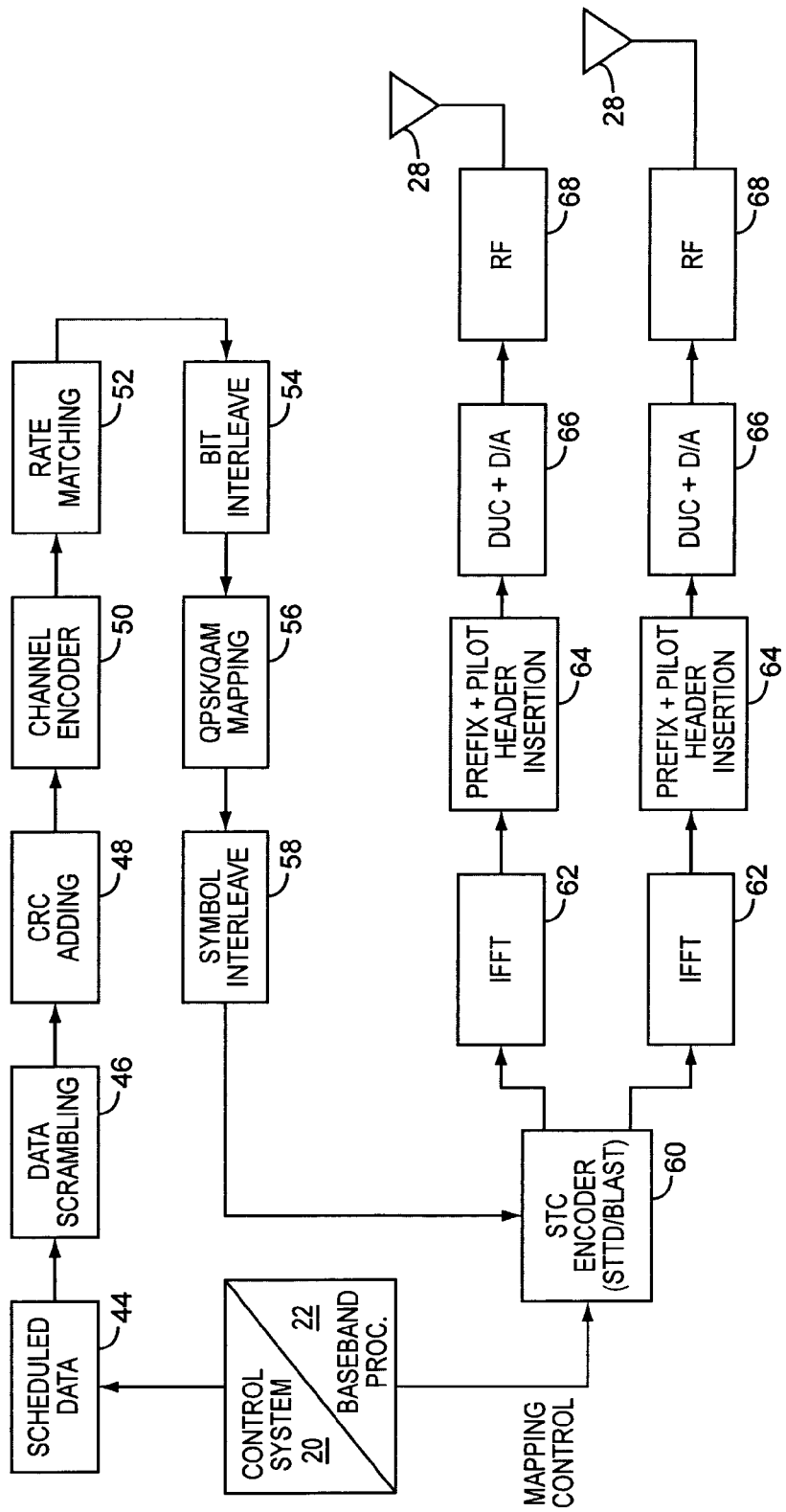
FIG. 19 is a logical breakdown of an OFDM transmitter architecture according to one embodiment of the present invention.

With reference to FIG. 19, a logical OFDM transmission architecture of a mobile station 16, base station 14, or relay station 18 is provided according to one embodiment. For clarity and conciseness, assume the following transmission architecture is in a base station 14. The data 44 to be transmitted is a stream of bits, which is scrambled in a manner reducing the peak-to-average power ratio associated with the data using data scrambling logic 46. A cyclic redundancy check (CRC) for the scrambled data is determined and appended to the scrambled data using CRC logic 48. Next, channel coding is performed using channel encoder logic 50 to effectively add redundancy to the data to facilitate recovery and error correction at the mobile station 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time block code (STC) encoder logic 60, which modifies the symbols in a fashion making the transmitted signals more resistant to interference and more readily decoded at a mobile station 16. The STC encoder logic 60 will process the incoming symbols and provide n outputs corresponding to the number of transmit antennas 28 for the base station 14. The control system 20 and/or baseband processor 22 will provide a mapping control signal to control STC encoding. At this point, assume the symbols for the n outputs are representative of the data to be transmitted and capable of being recovered by the mobile station 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing alone or in combination with other processing described herein. The IFFT processors 62 will preferably operate on the respective symbols using IDFT or like processing to effect an inverse Fourier Transform. The output of the IFFT processors 62 provides symbols in the time domain. The time domain symbols are grouped into frames, which are associated with prefix and pilot headers by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted to via the RF circuitry 68 and antennas 28. Notably, the transmitted data is preceded by pilot signals, which are known by the intended mobile station 16 and implemented by modulating the pilot header and scattered pilot sub-carriers. The mobile station 16 may use the scattered pilot signals for channel estimation and interference suppression and the header for identification of the base station 14. Again, this architecture may be provided in relay stations 18 and mobile stations 16.

Figure 20:
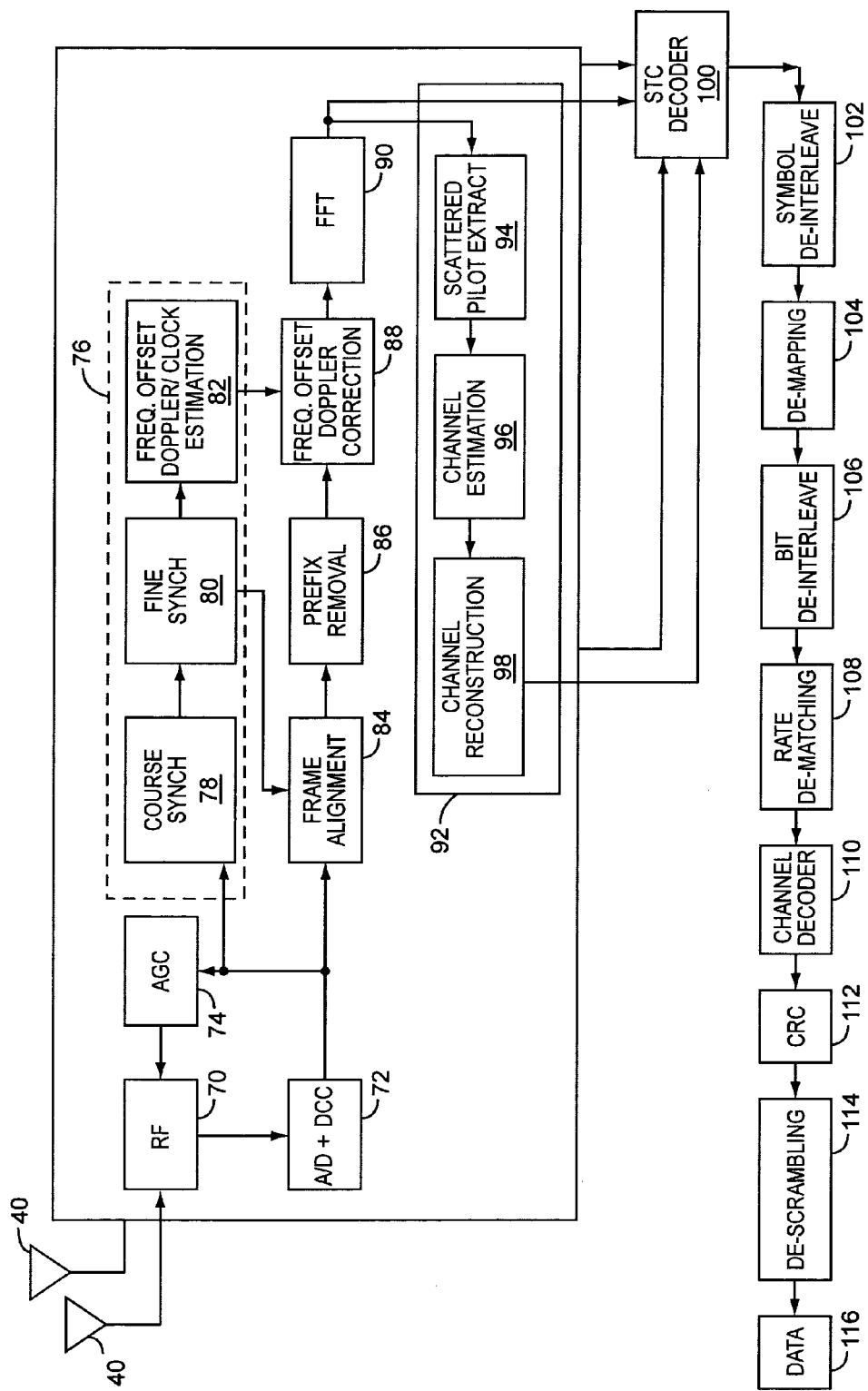
FIG. 20 is a logical breakdown of an OFDM receiver architecture according to one embodiment of the present invention.

Reference is now made to FIG. 20 to illustrate reception of the transmitted signals by a mobile station 16; however, the principles may be applied to a base station 14 or relay station 18 Upon arrival of the transmitted signals at each of the antennas 40 of the mobile station 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Preferably, each transmitted frame has a defined structure having two identical headers. Framing acquisition is based on the repetition of these identical headers. Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by the fine synchronization logic 80 to determine a precise framing starting position based on the headers. The output of the fine synchronization logic 80 facilitates frame acquisition by the frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and a resultant samples are sent to frequency offset and Doppler correction logic 88, which compensates for the system frequency offset caused by the unmatched local oscillators in the transmitter and the receiver and Doppler effects imposed on the transmitted signals. Preferably, the synchronization logic 76 includes frequency offset, Doppler, and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using the FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. The frequency domain symbols and channel reconstruction information for each receive path are provided to an STC decoder 100, which provides STC decoding on both received paths to recover the transmitted symbols. The channel reconstruction information provides the STC decoder 100 sufficient information to process the respective frequency domain symbols to remove the effects of the transmission channel.

The recovered symbols are placed back in order using the symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data.

While certain embodiments are discussed in the context of wireless networks operating in accordance with the IEEE 802.16 broadband wireless standard, which is hereby incorporated by reference, the invention is not limited in this regard and may be applicable to other broadband networks including those operating in accordance with other OFDM-based systems including the 3rd Generation Partnership Project ("3GPP") and 3GPP2 evolutions. Similarly, the present invention is not limited solely to OFDM-based systems and can be implemented in accordance with other system technologies, such as code division multiple access technologies or other frequency division multiple access technologies.

Those skilled in the art will recognize improvements and modifications to the preferred embodiments of the present invention. All such improvements and modifications are considered within the scope of the concepts disclosed herein and the claims that follow.

What is claimed is:

1. A relay station to be associated with a base station and a member relay station comprising:
   transmit and receive circuitry configured to facilitate wireless communications with the base station and a mobile station; and
   a control system associated with the transmit and receive circuitry and configured to:
      identify a first ranging region within an overall ranging region to use for a first ranging function, wherein the member relay station uses a second ranging region within the overall ranging region for the ranging function; and
      detect a first ranging code transmitted by the mobile station via first ranging resources within the first ranging region;
      process the first ranging code to facilitate the first ranging function, wherein different ranging codes are provided for each of the first and second ranging regions; and
      ignore ranging codes transmitted by the mobile station via ranging resources outside of the first ranging region for the first ranging function.

2. The relay station of claim 1 wherein in response to detecting the ranging code, the control system is further configured to:
   obtain transmission adjustments for the mobile terminal to use when transmitting information to the relay station; and
   send the transmission adjustments to the mobile station.

3. The relay station of claim 2 wherein the control system is further configured to provide transmission adjustment recommendations, which are used to determine the transmission adjustments for the mobile terminal.

4. The relay station of claim 3 wherein to obtain the transmission adjustments, the control system is further configured to:
   determine transmission adjustment recommendations;
   send code information including or identifying the first ranging code and the transmission adjustment recommendations to the base station; and
   receive the transmission adjustments from the base station.

5. The relay station of claim 4 wherein the control system is further configured to send a mobile station identifier and information identifying the first ranging resources or the first ranging region along with the code information and the transmission adjustment recommendations to the base station.

6. The relay station of claim 3 wherein the control system determines the transmission adjustments based on the transmission adjustment recommendations.

7. The relay station of claim 3 wherein the transmission adjustment recommendations bear on one of a group consisting of transmission time, transmission frequency, and transmission power associated with transmission of the first ranging code.

8. The relay station of claim 1 wherein the base station uses a third ranging region within the overall ranging region for the first ranging function.

9. The relay station of claim 1 wherein the first and second ranging regions have common ranging codes, including the first ranging code, that can be assigned to the mobile station.

10. The relay station of claim 1 wherein the wireless communications with the mobile station are provided using orthogonal frequency division multiplexing, the first ranging region comprises a first group of sub-carriers within a transmit frame, and the second ranging region comprises a second group of sub-carriers within the transmit frame.

11. The relay station of claim 1 wherein ranging resources of the first ranging region are orthogonal to ranging resources of the second ranging region.

12. The relay station of claim 1 wherein the ranging function is an initial ranging function provided prior to the mobile station initiating data or voice communications via the relay station.

13. The relay station of claim 1 wherein the ranging function is a periodic ranging function provided while the mobile station is engaged in data or voice communications via the relay station.

14. The relay station of claim 1 wherein the ranging function is a handoff ranging function provided while the mobile station is engaged in a handoff procedure to transition from the relay station to the member relay station.

15. The relay station of claim 1 wherein the ranging function is a handoff ranging function provided while the mobile station is engaged in requesting additional bandwidth from the relay station.

16. The relay station of claim 1 wherein the control system is further configured to ignore ranging codes transmitted by the mobile station via ranging resources of the second ranging region for the ranging function.

17. The relay station of claim 1 wherein to identify the first ranging region, the control system is configured to receive a message from the base station, which allocates the first ranging region to the first relay station and a second ranging region to the second relay station.

18. A base station to be associated with a plurality of relay stations for facilitating wireless communications with a mobile station, the base station comprising:
   transmit and receive circuitry configured to facilitate wireless communications with the plurality of relay stations and the mobile station; and
   a control system associated with the transmit and receive circuitry and configured to:

for each relay station of the plurality of relay stations, identify a unique ranging region within an overall ranging region to use for a first ranging function;

receive a code grab message from a first relay station of the plurality of relay stations, the code grab message comprising transmission adjustment recommendations and a first ranging code or an identifier of the first ranging code that was received by the first relay station and transmitted by the mobile station via first ranging resources within a first ranging region of a plurality of ranging regions;

process the first ranging code to facilitate the first ranging function, wherein different ranging codes are provided for each of the first and second ranging regions;

identify for the base station a unique base station ranging region within an overall ranging region to use for the first ranging function, such that each of the plurality of relay stations and the base station are allocated different ranging regions for the ranging function; and ignore ranging codes transmitted by the mobile station via ranging resources outside of the unique base station ranging region allocated for the base station.

19. The base station of claim 18 further comprising sending a message to each of the plurality of relay stations to allocate the unique ranging region for each of the plurality of relay stations.

20. The base station of claim 18 wherein to process the first ranging code, the control system is further configured to:

determine transmission adjustments for the mobile station to use when transmitting information to the first relay station; and send the transmission adjustments to the first relay station for delivery to the mobile station.

21. The base station of claim 20 wherein the control system is further configured to:

detect a second ranging code transmitted by the mobile station via second ranging resources within a base station ranging region;

in response to detecting the second ranging code, determine transmission adjustments for the mobile terminal to use when transmitting information to the relay station; and send the transmission adjustments to the mobile station.

22. The base station of claim 18 wherein the code grab message further comprises a mobile station identifier and information identifying the first ranging resources or the first ranging region.

23. The base station of claim 18 wherein the transmission adjustment recommendations bear on one of a group consisting of transmission time, transmission frequency, and transmission power associated with transmission of the first ranging code.

24. The base station of claim 18 wherein ranging resources of each of the plurality of ranging regions are orthogonal to one another.

25. The base station of claim 18 wherein the ranging function is an initial ranging function provided prior to the mobile station initiating data or voice communications via one of the plurality of relay stations.

26. The base station of claim 18 wherein the ranging function is a periodic ranging function provided while the mobile station is engaged in data or voice communications via the relay station.

27. The base station of claim 18 wherein the ranging function is a handoff ranging function provided while the mobile station is engaged in a handoff procedure to transition from one of the plurality of relay stations to another of the plurality of relay stations.

28. The base station of claim 18 wherein the ranging function is a handoff ranging function provided while the mobile station is engaged in requesting additional bandwidth from one of the plurality of relay stations.

29. The base station of claim 18 wherein each of the plurality of ranging regions have common ranging codes that can be assigned to the mobile station.

30. The base station of claim 18 wherein the wireless communications with the mobile station are provided using orthogonal frequency division multiplexing, and each of the plurality of ranging regions comprise unique groups of subcarriers within a transmit frame.

* * * * *